US012654935B2

(12) United States Patent
Kalouche et al.

(10) Patent No.: US 12,654,935 B2
(45) Date of Patent: Jun. 16, 2026

(54) ROBOTIC STORAGE AND RETRIEVAL SYSTEMS

(71) Applicant: Nimble Robotics, Inc., San Francisco, CA (US)

(72) Inventors: Simon Kalouche, San Francisco, CA (US); Yeolim Jo, San Francisco, CA (US); Matthew Shekels, Daly City, CA (US); Mike Stevens, Redwood City, CA (US); Christopher McQuin, Mountain View, CA (US)

(73) Assignee: Nimble Robotics, Inc., San Francisco, CA (US)

( * ) Notice: Subject to any disclaimer, the term of this patent is extended or adjusted under 35 U.S.C. 154(b) by 617 days.

(21) Appl. No.: 17/826,384

(22) Filed: May 27, 2022

(65) Prior Publication Data

US 2022/0388774 A1 Dec. 8, 2022

Related U.S. Application Data

(60) Provisional application No. 63/336,644, filed on Apr. 29, 2022, provisional application No. 63/303,166, (Continued)

(51) Int. Cl.
*B65G 1/04* (2006.01)
*B25J 5/00* (2006.01)
(Continued)

(52) U.S. Cl.
CPC ............ *B65G 1/0464* (2013.01); *B25J 5/007* (2013.01); *B25J 5/02* (2013.01); *B25J 15/0047* (2013.01)

(58) Field of Classification Search
CPC .................................................... B65G 1/0464
See application file for complete search history.

(56) References Cited

U.S. PATENT DOCUMENTS 9,682,822 B2 * 6/2017 Lindbo ................. B65G 1/137
11,745,944 B2 * 9/2023 Zhang ................. B65G 1/0414
414/279

(Continued)

FOREIGN PATENT DOCUMENTS

CN 111422547 A 7/2020
CN 112777200 A 5/2021
(Continued)

OTHER PUBLICATIONS

International Search Report & Written Opinion issued in Appln. No. PCT/US2022/031248 mailed Dec. 9, 2022 (21 pages).

(Continued)

*Primary Examiner* — Mark C Hageman
(74) *Attorney, Agent, or Firm* — POLSINELLI PC

(57) ABSTRACT

A robot includes a body coupled to a wheel assembly and a container retrieval device. The wheel assembly has a plurality of wheels and a drive mechanism arranged to move the body along a first set of parallel rails and along a second set of parallel rails. The container retrieval device includes an extendable and retractable grapple arranged to selectively secure an engagement feature positioned between a rim and a bottom surface of a container. The grapple thus allows the robot to lift multiple containers in a single lift.

20 Claims, 23 Drawing Sheets

Related U.S. Application Data filed on Jan. 26, 2022, provisional application No. 63/196,350, filed on Jun. 3, 2021.

(51) Int. Cl.
   *B25J 5/02*      (2006.01)
   *B25J 15/00*      (2006.01)

(56) References Cited

U.S. PATENT DOCUMENTS

| | | | | |
|---|---|---|---|---|
| 11,961,751 | B2 * | 4/2024 | Kobayashi | F16F 15/085 |
| 11,981,506 | B2 * | 5/2024 | Van Buijtene | B65G 1/0492 |
| 2008/0152466 | A1 * | 6/2008 | Bonora | B65G 1/0407 |
| | | | | 414/935 |
| 2021/0032034 | A1 | 2/2021 | Kalouche | |
| 2021/0188549 | A1 * | 6/2021 | Fjeldheim | B65G 1/0464 |
| 2022/0402694 | A1 * | 12/2022 | Kobayashi | B66C 13/04 |
| 2023/0183002 | A1 * | 6/2023 | Heggebø | B65G 1/0464 |
| | | | | 414/279 |
| 2023/0331478 | A1 * | 10/2023 | Chatain | B65G 1/065 |

FOREIGN PATENT DOCUMENTS

| | | |
|---|---|---|
| JP | 2021042025 A | 3/2021 |
| WO | 2020094339 A1 | 5/2020 |
| WO | 2021021807 A1 | 2/2021 |

OTHER PUBLICATIONS

PCT Invitation to Pay Fees With Communication Relating to Partial International Search Report issued in Appln. No. PCT/US2022/031248 dated Oct. 18, 2022 (16 pages).

International Preliminary Report on Patentability for International Application No. PCT/US2022/031248, mailed Dec. 14, 2023, 14 Pages.

Office Action for European Patent Application No. 22732818.4, mailed Dec. 11, 2025, 12 pages.

* cited by examiner

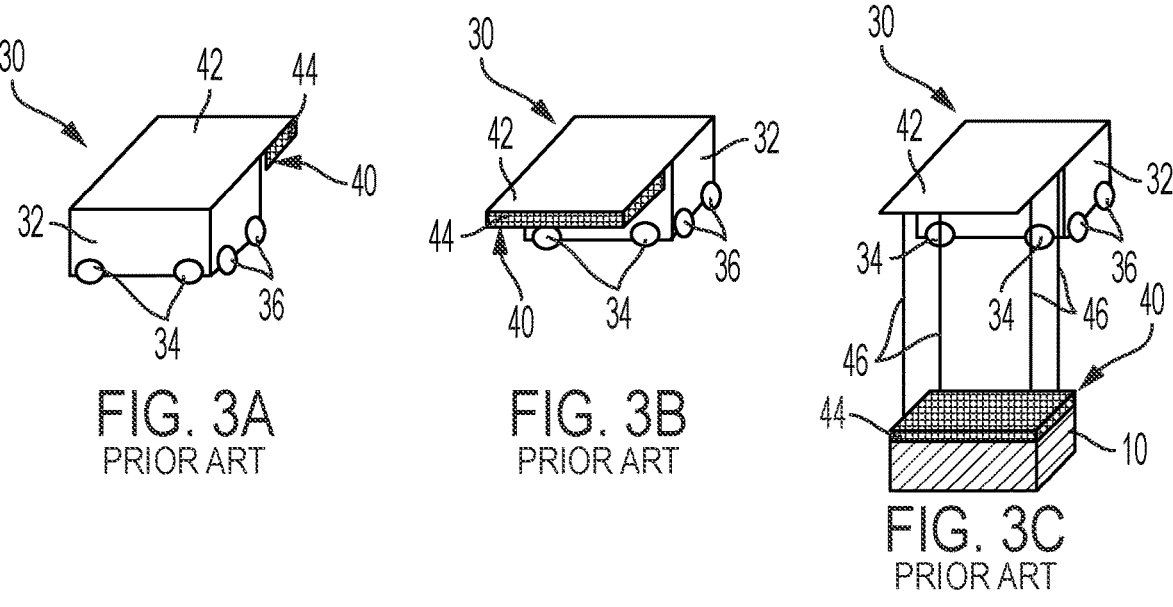
FIG. 3A
PRIOR ART
FIG. 3B
PRIOR ART
FIG. 3C
PRIOR ART
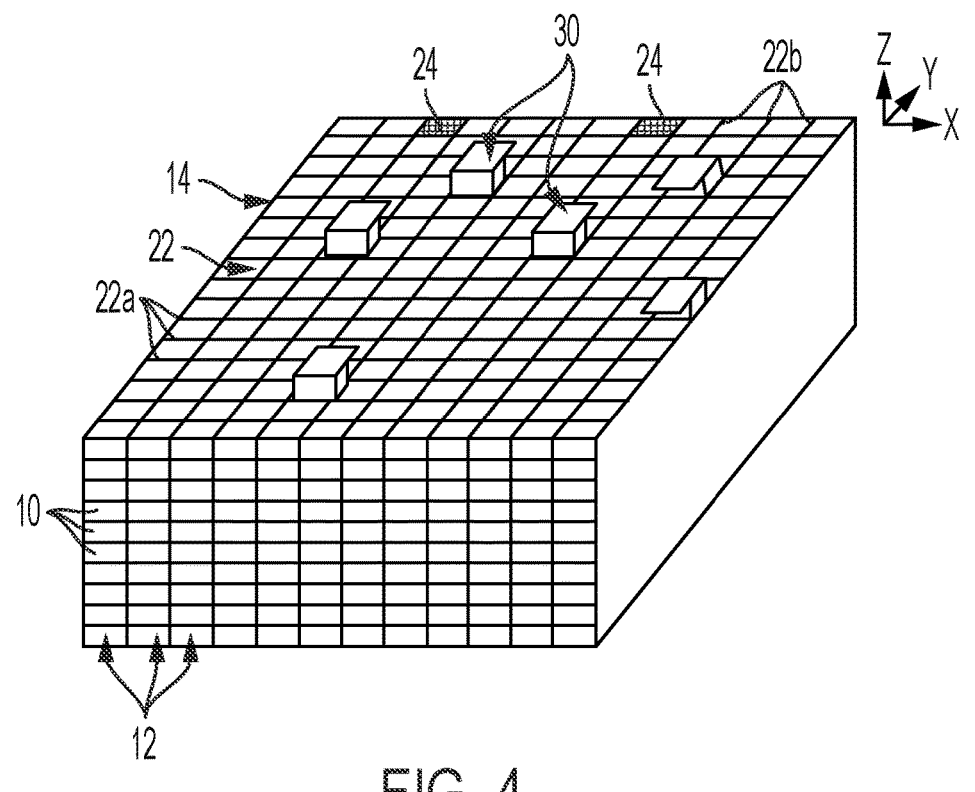
FIG. 4
PRIOR ART

512

522

514

522

512

520

508

518

516

512

514

520

512

ROBOTIC STORAGE AND RETRIEVAL SYSTEMS

CROSS-REFERENCE TO RELATED APPLICATIONS

This application claims the benefit of the filing date of U.S. Provisional Patent Application No. 63/196,350, filed Jun. 3, 2021, and U.S. Provisional Patent Application No. 63/303,166, filed Jan. 26, 2022, and U.S. Provisional Patent Application No. 63/336,644, filed Apr. 29, 2022, the disclosures of which are incorporated herein by reference.

BACKGROUND

The present disclosure relates generally to robotic storage and retrieval systems, and more particularly, to stabilization feet and floormats that assists in the assembly of a storage system, stackable containers for storing inventory items within the storage system, and a grapple for extracting the stackable containers from the storage system.

Warehouses, or distribution fulfillment centers, require systems that enable the efficient storage and retrieval of a large number of diverse products. Traditionally, inventory items are stored in containers and arranged on rows of shelving on either side of an aisle. Each container, or bin, holds a plurality of items of one or more product types. The aisles provide access between the shelving for an operator or robot to migrate the aisles and retrieve the items. It is well understood that the aisles reduce the storage density of the system. In other words, the amount of space actually used for the storage of products (e.g., the shelving) is relatively small compared to the amount of space required for the storage system as a whole. As warehouse space is often scarce and expensive, alternative storage systems that maximize storage space are desired.

In one alternative approach, which offers a significant improvement in storage density, containers are stacked on top of one another and arranged in adjacent rows. That is, no aisle is provided between the adjacent rows of stacked containers. Thus, more containers, and in turn inventory, can be stored in a given space.

Various methods for retrieving inventory from the stacked containers have been contemplated. U.S. Pat. No. 9,682,822, for example, discloses a system in which containers are stacked and arranged in a plurality of rows underneath a grid. Vehicles equipped with a lifting apparatus navigate the grid and lift a desired container. The container is then transported down a port to a picking/sorting zone, where an operator or robot picks individual products from the container and sorts the products into one or more order containers. To minimize unnecessary transportation of the containers, each container is typically transported to the picking/sorting zone only after multiple orders of a specific product have been received.

Despite the increased storage density provided by the known stacked storage system, various shortcoming remain. For example, constructing the frame of the storage structure is both labor intensive and tedious as care must be taken to align the components as the storage structure is erected. Furthermore, the containers do not include a structural feature that allows the vehicle to lift multiple containers in a single lift. As a result, the process of extracting a container that is buried within a stack of containers (e.g., underneath one or more other containers) can be a time-consuming process that results in decreased throughput of the system.

BRIEF SUMMARY

The foot and/floormat disclosed herein are designed to automatically position the vertical members of the frame and/or the stackable containers thereby allowing the frame to can be constructed more quickly and the storage and retrieval system to operate more efficiently. Furthermore, the grapple and containers disclosed herein allow a robot operating on the frame to extract multiple containers in a single lift thereby reducing the time it takes the robot to perform a "digging" operation.

In one aspect, a robot includes: a body coupled to a wheel assembly, the wheel assembly including a plurality of wheels and a drive mechanism arranged to move the body along a first set of parallel rails and along a second set of parallel rails; and a container retrieval device including a grapple extendable and retractable in a vertical direction and arranged to selectively secure an engagement feature positioned between a rim and a bottom surface of a container.

Container retrieval device may further include a pair of support arms having a winding mechanism, the grapple may be coupled to the pair of support arms by a cable configured to be wound and unwound about the winding mechanism to extend or retract the grapple in the vertical direction.

The grapple may include two grapple arms defining a receiving space therebetween.

A flap may be associate with each of the two grapple arms, each one of the flaps may be pivotable between an undeployed condition in which the flap lies substantially flush against an interior surface of a respective grapple arm such that the receiving space is sized to receive a container therein and a deployed condition in which the flap extends away from the grapple arm and into the receiving space.

Each one of the two grapple arms may extend along an axis and the flap may be pivotable about a pivot axis arranged parallel to the axis.

The grapple may further include an actuator coupled to the flap to pivot the flap about the pivot axis.

The grapple may further include a spring provided between a portion of the grapple arm and the actuator to bias the actuator to a natural position, and when the actuator is in the natural position, the flap may be in the undeployed condition.

Actuation of the actuator may compress the spring and pivot the flap from the undeployed condition to the deployed condition.

The container retrieval device may be supported by a leg coupled to each one of the support arms, and each one of the legs may be configured to contact the first and second sets of parallel rails.

Each one of the legs may include a spring-loaded bearing or rolling member configured to move along the first and second sets of parallel rails.

The support arms may have a length of approximately one grid-space and each one of the legs may be attached to a terminal end of the support arm opposite the body.

The support arms of the container retrieval device may be supported at a first location by the body and at a second location spaced from the body by suspension wires.

The suspension wires may be tensioned between a tower extending from the body and an attachment provided at the second location.

In another aspect, a stackable container for storing inventory items in a grid-based storage system, includes: a bottom having a nesting feature; sidewalls enclosing the bottom, the bottom and the sidewalls collectively defining an interior for housing the inventory items, the sidewalls including an upper surface forming a rim about the interior; and an engagement feature arranged to engage a container retrieval device, the engagement feature positioned between the rim and the bottom.

The engagement feature may include a first rib on a first one of the sidewalls and a second rib on a second one of the sidewalls opposite the first one of the sidewalls.

The engagement feature may include a horizontal rib.

The container may further include an angled rib extending from the horizontal rib toward the bottom at an oblique angle.

The upper surfaces of each one of the sidewalls may define a lead-in chamfer angled downwardly and inwardly toward the interior.

The nesting feature may include a ledge and a projection extending from the ledge toward the bottom of the container.

The sidewalls may be textured and have a non-reflective, matte finish.

The container may further include a first partition disposed within the interior space dividing the interior space into a first section defining a first volume and a second section defining a second volume, the first partition may be moveable relative to the bottom to increase the first volume of the first section and decrease the second volume of the second section.

The first partition may extend across the interior space on a partition plane such that the first section and second section are on opposite sides of the partition plane and the first partition may be movable to slide along an axis normal to the partition plane.

The first partition may include at least one tongue, and an interior surface of the container may define a groove extending in a direction parallel to the axis, the groove may be arranged to receive the at least one tongue.

The at least one tongue may include a plurality of tongues.

The interior surface of one of the sidewalls may define a vertical track configured to receive the first partition and to permit the first partition to be inserted into and removed from the interior of the container. The container may further include a first partition and a second partition moveable relative to one another.

The first partition may be movable relative to the bottom along a first axis, and the second partition may be movable relative to the bottom along a second axis perpendicular to the first axis.

The first and second partitions may be disposed within the interior space, each of the first and second partitions may have an attached end pivotably coupled to a respective one of the sidewalls about a vertical axis and a free end opposite the attached end such that the first and second partitions are pivotable between a dividing position in which the first and second partitions collectively divide the interior space into a first section defining a first volume and a second section defining a second volume and an un-divided position in which a surface of the first and second partitions lie generally flush against an interior surface of the one of the sidewalls.

The container may further include bomb bay doors movable between a closed condition and an open condition.

The bomb bay doors may be biased toward the closed condition.

The rim may extend outwardly from the sidewalls and may include a contact feature arranged to transition the bomb bay doors between the closed and open conditions.

In yet another aspect, a foot for a storage frame, includes: a base defining a recess; a column movably disposed within the recess of the base, the column defining a sidewall having a tapered lower guide wall and a receptacle configured to receive a pillar of the storage frame; and a wedge having a tapered upper surface arranged to engage the tapered lower guide wall of the column, whereby, when a backend of the wedge is moved toward the column, the column moves upward within the recess, and whereby the backend of the wedge is moved away from the column, the column moves downward within the recess.

The base may further define a sloped corner arranged to align and stabilize a container.

The base may define a first set of teeth and the wedge may define a second set of teeth arranged to engage the first set of teeth for selectively locking the wedge to the base.

The wedge may be generally U-shaped and include a pair of wings.

The foot may further include a spring disposed between the pair of wings.

The base may define an underpass configured to receive a track.

The base may further include a protrusion sized and configured to be disposed within an aperture of the track for securing the foot to the track.

In a further aspect, a floormat, includes: a base including a perimeter having four corners, the base defining an L-shaped notch at each of the four corners.

The floormat may further include a rectangular lip or cutout defining a pocket arranged to receive and secure a container.

The pocket may be centrally arranged within the perimeter of the base.

The floormat may further include interlocking fastening components provided at the perimeter of the base.

The interlocking fastening component may include dovetail teeth.

The base may define holes configured to receive a fastener for securing the floormat to a surface.

In still another aspect, a system includes: at least sixteen floormats, each floormat having a base defining a pocket and a perimeter with four corners, each of the four corners defining an L-shaped notch such that when the sixteen floormats are disposed in a side-by-side rectangular arrangement, the sixteen floormats form a grid of pocket, each pocket being located at the junction of four adjacent floormats; a plurality of containers for storing inventory items, the plurality of containers being arranged in vertical stacks secured within the pockets; and a frame, comprising: vertical support members disposed within each rectangular cutout; and a grid disposed above the containers, the grid including a first set of parallel rails extending in a first direction and a second set of parallel rails extending in a second direction substantially perpendicular to the first direction such that the first and second set of parallel rails collectively define grid spaces, each stack of containers being substantially centrally located within a respective grid space.

Each one of the containers may include: a bottom surface having a nesting feature; sidewalls enclosing the bottom surface, the bottom surface and the sidewalls collectively defining an interior for housing the inventory items, the sidewalls including an upper surface forming a rim; and an engagement feature arranged to engage a container retrieval device, the engagement feature positioned between the rim and the bottom surface.

BRIEF DESCRIPTION OF THE DRAWINGS

FIGS. 3A and 3B are schematic perspective views, from the rear and front respectively, of a load handling device according to the prior art for use with the frame depicted in FIGS. 1 and 2.

FIG. 3C is a schematic perspective view depicting a container being lifted by the load handling device of FIGS. 3A and 3B.

FIG. 4 is a schematic perspective view of the frame of FIG. 1 having a plurality of the load handling devices of FIGS. 3A-3C installed on the frame.

DETAILED DESCRIPTION

As used herein, when terms of orientation, for example, "vertical" and "horizontal" or relative terms such as, "above," "upwards," "beneath," "downwards" and the like are used to describe the orientation or relative position of specific features of the storage structure or mobile robot, the terms are in reference to the orientation or the relative position of the features in the normal gravitational frame of reference when the storage structure is positioned with a bottom of the storage structure resting on a surface. Also as used herein, the terms "substantially," "generally," and "about" are intended to mean that slight deviations from absolute are included within the scope of the term so modified.

Figure 1:
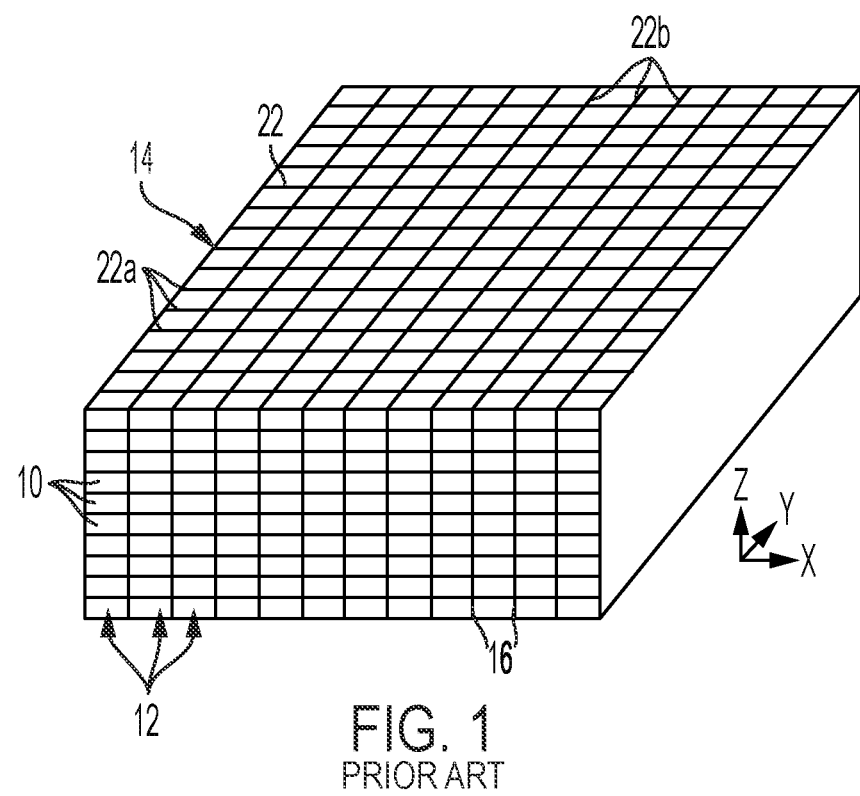
FIG. 1 is a schematic perspective view of a frame for housing a plurality of stacked containers according to the prior art.
Figure 2:
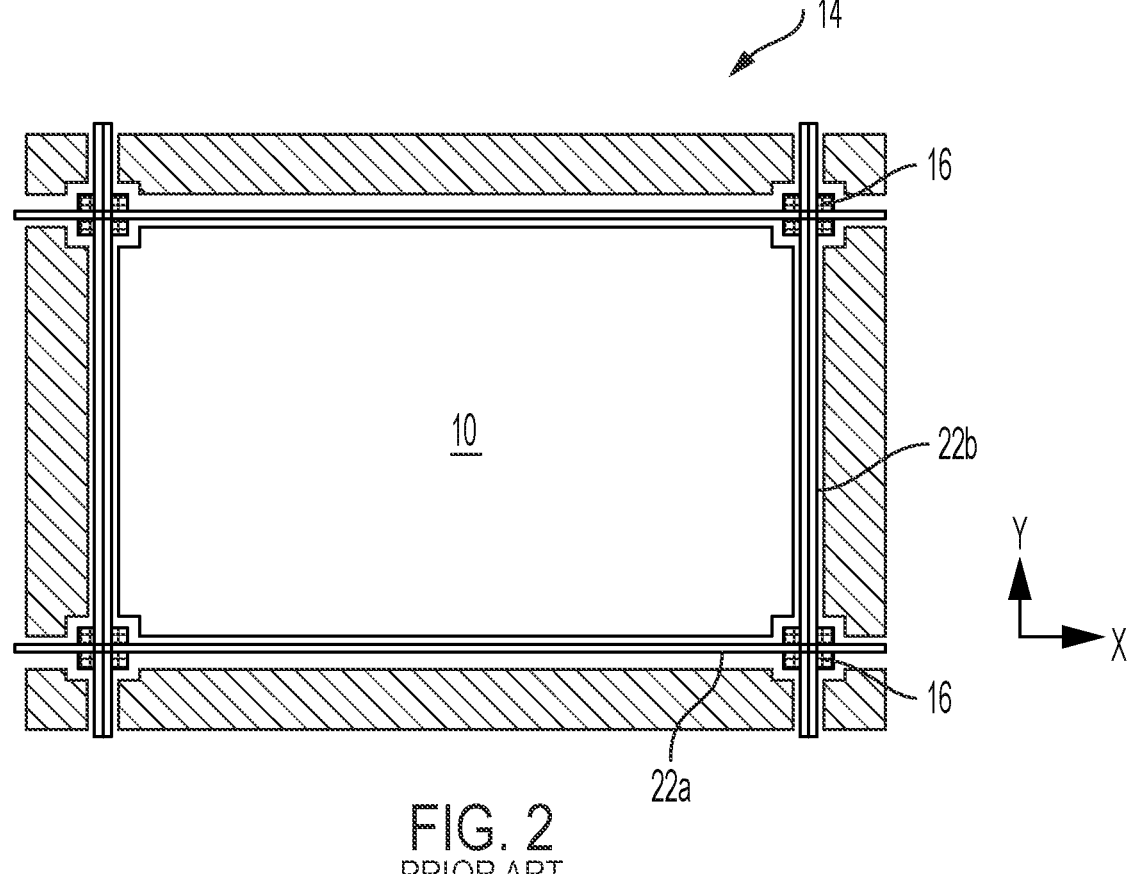
FIG. 2 is a schematic plan view of a portion of the frame of FIG. 1.

FIGS. 1 and 2 illustrate a storage structure for efficiently storing a plurality of stackable containers 10, also known as bins, according to the prior art. Containers 10 have a flat bottom surface designed to rest against a flat upper surface, or rim, of another container such that the containers can be stacked on top of one another to form stacks 12 and arranged in a frame 14. Each container 10 typically holds a plurality of product items (not shown).

Frame 14 includes a plurality of vertical members 16 that form a plurality of vertically extending shafts within which stacks 12 are housed. The cross-sectional area of each shaft is dimensioned to substantially correspond to the dimensions of containers 10. Put another way, when the stacks 12 of containers 10 are housed with the shafts of frame 14, little to no space exists between an outer surface of the containers and vertical members 16, as is shown in FIG. 2. Frame 14 is thus constructed to guard against horizontal movement of the stacks 12 of bins 10 and to guide vertical movement of the bins.

Vertical members 16 support a series of rails 22 arranged in a grid pattern, at an uppermost level of frame 14, which form a plurality of "grid spaces." With additional reference to FIGS. 3A-3C and 4, rails 22 support a plurality of robotic load handling devices 30. A first set of parallel rails 22a guides movement of load handling devices 30 in a first direction (e.g., the X-direction) across the top of frame 14, and a second set of parallel rails 22b, arranged perpendicular to the first set of parallel rails, guides movement of the load handling devices in a second direction (e.g., the Y-direction) across the top of the frame. In this manner, rails 22 allow load handling devices 30 to move laterally in two directions (in the X-direction and in the Y-direction) across the top of frame 14 such that the load handling devices can be moved into position above any one of the stacks 12 of bins 10.

Each load handling device 30 includes a vehicle 32 with a first set of wheels 34, consisting of a pair of wheels on the front of the vehicle and a pair of wheels on the back of the vehicle, arranged to engage with two adjacent rails of the first set of rails 22a. Similarly, a second set of wheels 36, consisting of a pair of wheels on each lateral side of the vehicle, is arranged to engage with two adjacent rails of the second set of rails 22*b*. Each set of wheels 34, 36 can be lifted and lowered, so that either the first set of wheels 34 or the second set of wheels 36 is engaged with the respective set of rails 22*a*, 22*b* depending on the desired direction of movement of vehicle 32.

When the first set of wheels 34 is engaged with the first set of rails 22*a* and the second set of wheels 36 is lifted clear from the second set of rails 22*b*, the first set of wheels can be driven, by way of a drive mechanism (not shown) housed in vehicle 32, to move the load handling device 30 in the X-direction. To move the load handling device 30 in the Y-direction, the first set of wheels 34 is lifted clear of rails 22*a*, and the second set of wheels 36 is lowered into engagement with the second set of rails 22*b*. A drive mechanism (not shown) associated with the second set of wheels 36 can then be used to drive the second set of wheels in the Y-direction.

Load handling device 30 is also equipped with a crane device 40 having a cantilever arm 42 that extends laterally from the top of vehicle 32. A gripper plate 44 is suspended from cantilever arm 42 by cables 46 that are connected to a winding mechanism (not shown) housed within vehicle 32. Cables 46 thus can be spooled into or out from cantilever arm 42 to adjust gripper plate 44 with respect to the vehicle 32 in the Z-direction.

Gripper plate 44 is adapted to engage with the top of a bin 10. For example, gripper plate 44 may include pins (not shown) that floormate with corresponding holes (not shown) in the rim that forms the top surface of bin 10 and sliding clips (not shown) that are engageable with the rim to grip the bin. The clips are driven into engagement with bin 10 by a suitable drive mechanism housed within gripper plate 44, which may be powered and controlled by signals carried through cables 46, or through a separate control cable (not shown).

To remove a bin 10 from the top of a stack 12, the load handling device 30 is moved as necessary in the X and Y directions so that the gripper plate 44 is positioned above the stack in which the desired bin is located. Gripper plate 44 is then lowered and brought into engagement with the bin 10 on top of stack 12, as shown in FIG. 3C. After the clips have engaged with and secured bin 10, gripper plate 44 and, in turn the bin, may then be pulled upwards by spooling cables 46. At the peak of its vertical travel, bin 10 is accommodated beneath cantilever arm 42 and is held above rails 22. In this way, load handling device 30 can transport bin 10 to another location. Cables 46 are long enough to allow handling device 30 to retrieve and place bins 10 at any depth within stack 12, including the floor level. Vehicle 32 is sufficiently heavy to counterbalance the weight of bin 10 and to remain stable during the lifting process. Much of the weight of vehicle 32 is attributed to the large and heavy batteries that are required to power and operate the drive mechanisms of wheels 34, 36.

The known storage structure, as shown in FIG. 4, may include a plurality of load handling devices 30 that operate simultaneously to increase the throughput of the system. The storage structure depicted in FIG. 4 includes two ports 24 for transferring bins 10 into or out of the storage structure. An additional conveyor system (not shown) may be associated with each port 24. In this manner, bins 10 that are transported to port 24 by load handling device 30 can be subsequently transferred to a picking/sorting station (not shown) where the products contained in the bins are picked and sorted into individual orders. Similarly, bins 10 can be moved by the conveyor system to port 24 from an external location, such as a bin-filling station (not shown) and transported to a stack 12 by the load handling devices 30 to restock the storage structure.

If it is necessary to retrieve a bin ("target bin") that is not located on the top of stack 12, then the overlying bins 10*a* ("non-target bins") (e.g., the bins located between the target bin 10*b* and rails 22) must first be moved to allow load handling device 30 to access the target bin. This operation is referred to as "digging".

Figure 5:
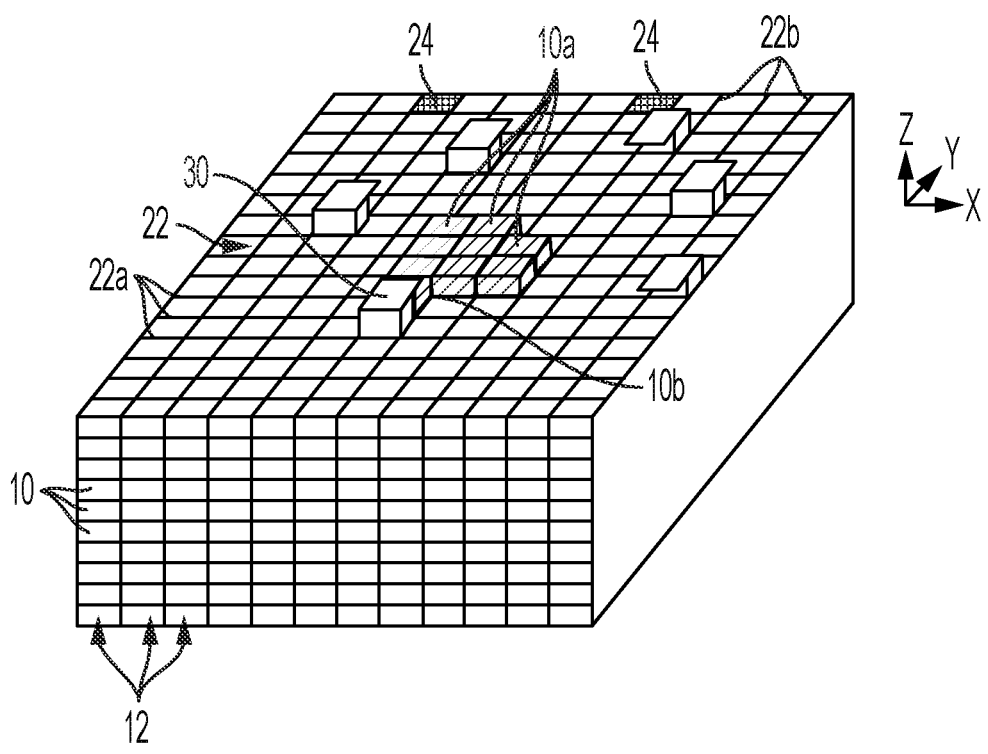
FIG. 5 is a schematic perspective view of the load handling devices installed on the frame of FIG. 4 and illustrates the load handling devices performing a digging operation to retrieve a target container from a stack of containers.

FIG. 5 illustrates a known digging operation in which one of the load handling devices 30 sequentially lifts each non-target bin 10*a* from the stack 12 of bins 10 containing target bin 10*b*. Each of the non-target bins 10*a* may be placed in a temporary location on top of another stack 12. After each of the non-target bins 10*a* have been removed, target bin 10*b* can be extracted from frame 14 by load handling device 30 and transported to port 24. After target bin 10*b* has been extracted, non-target bins 10*a* may be placed back in the original stack 12 to restore the original order of the stack less the target bin.

To assemble frame 14, a worker must first determine the location at which each vertical member 16 should be fixed. This determination is typically performed by conducting a series of measurements, marking a "grid" on the warehouse floor, securing a stabilization foot at each marked location and fastening a vertical member to each stabilization foot. The measuring and securing steps are labor intensive and costly processes that require great precision as even slight misalignments can negatively impact the alignment of frame 14.

Figure 6A:
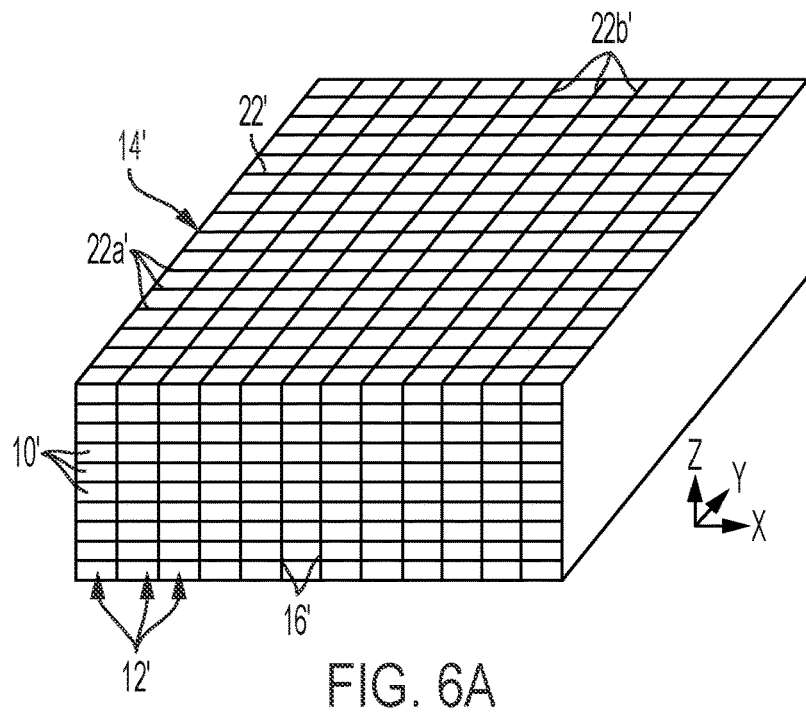
FIG. 6A is a schematic perspective view of a frame for housing a plurality of stacked containers according to an embodiment of the present disclosure.
Figure 6B:
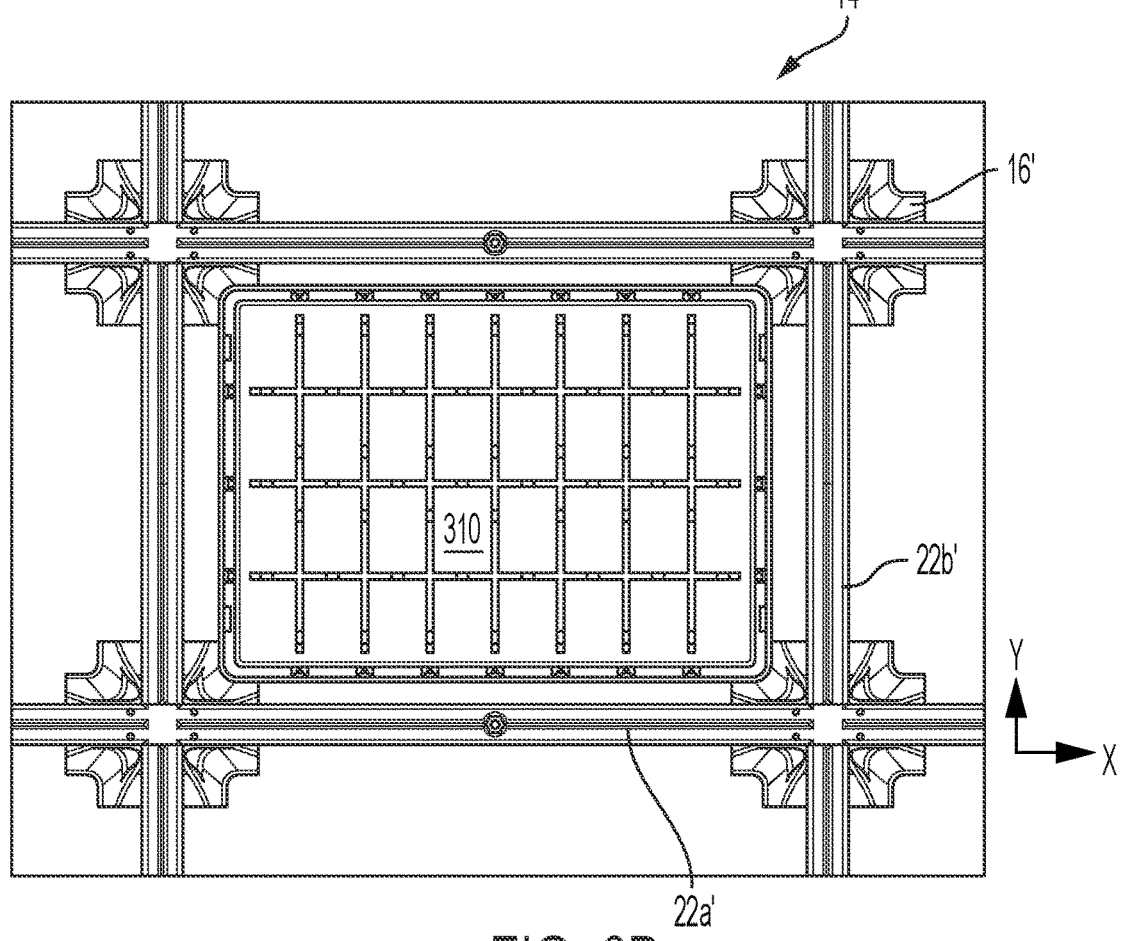
FIG. 6B is a schematic plan view of a portion of the frame of FIG. 6A.
Figure 7A:
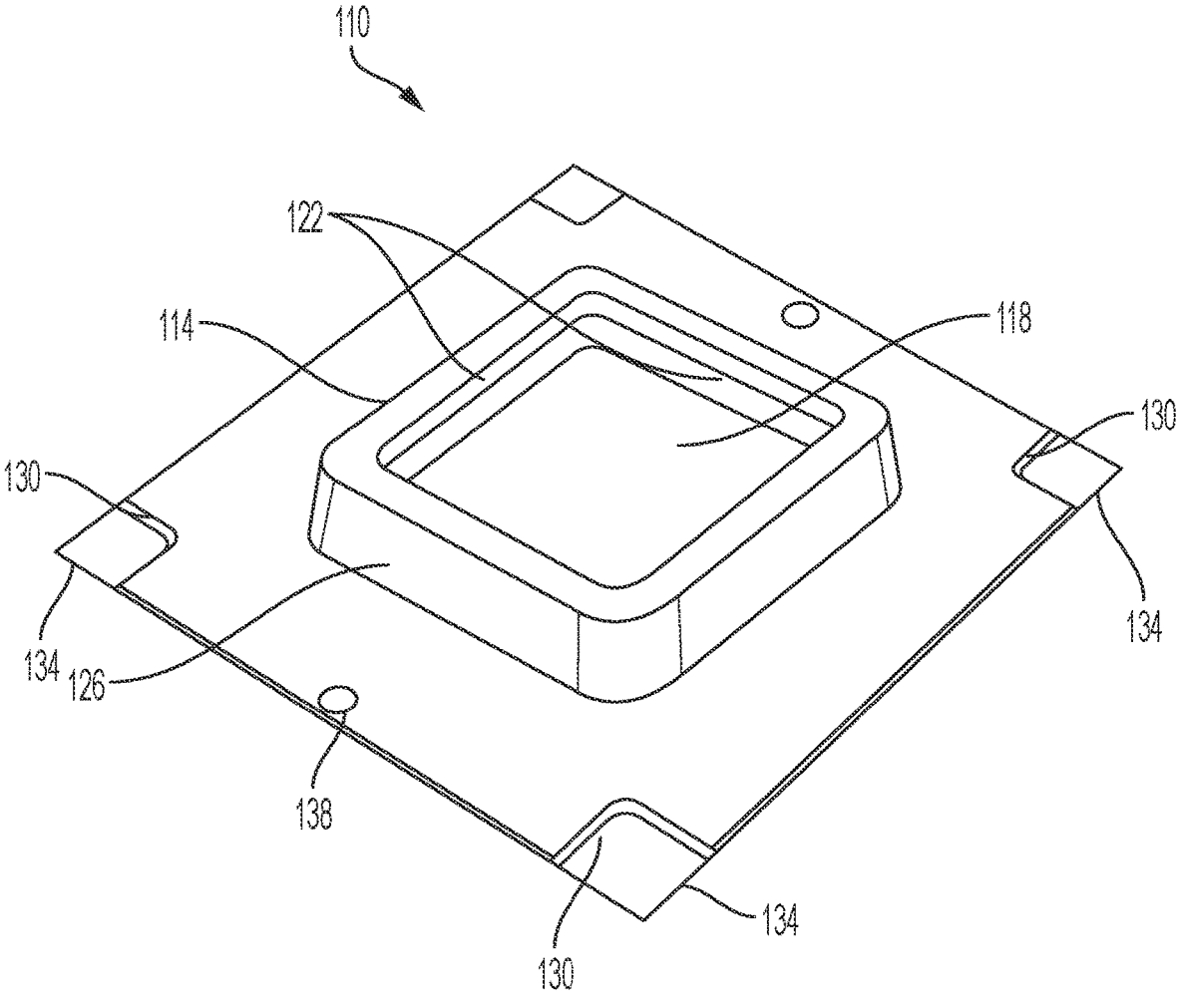
FIG. 7A is a perspective view of a floormat according to an aspect of the present disclosure.
Figure 7B:
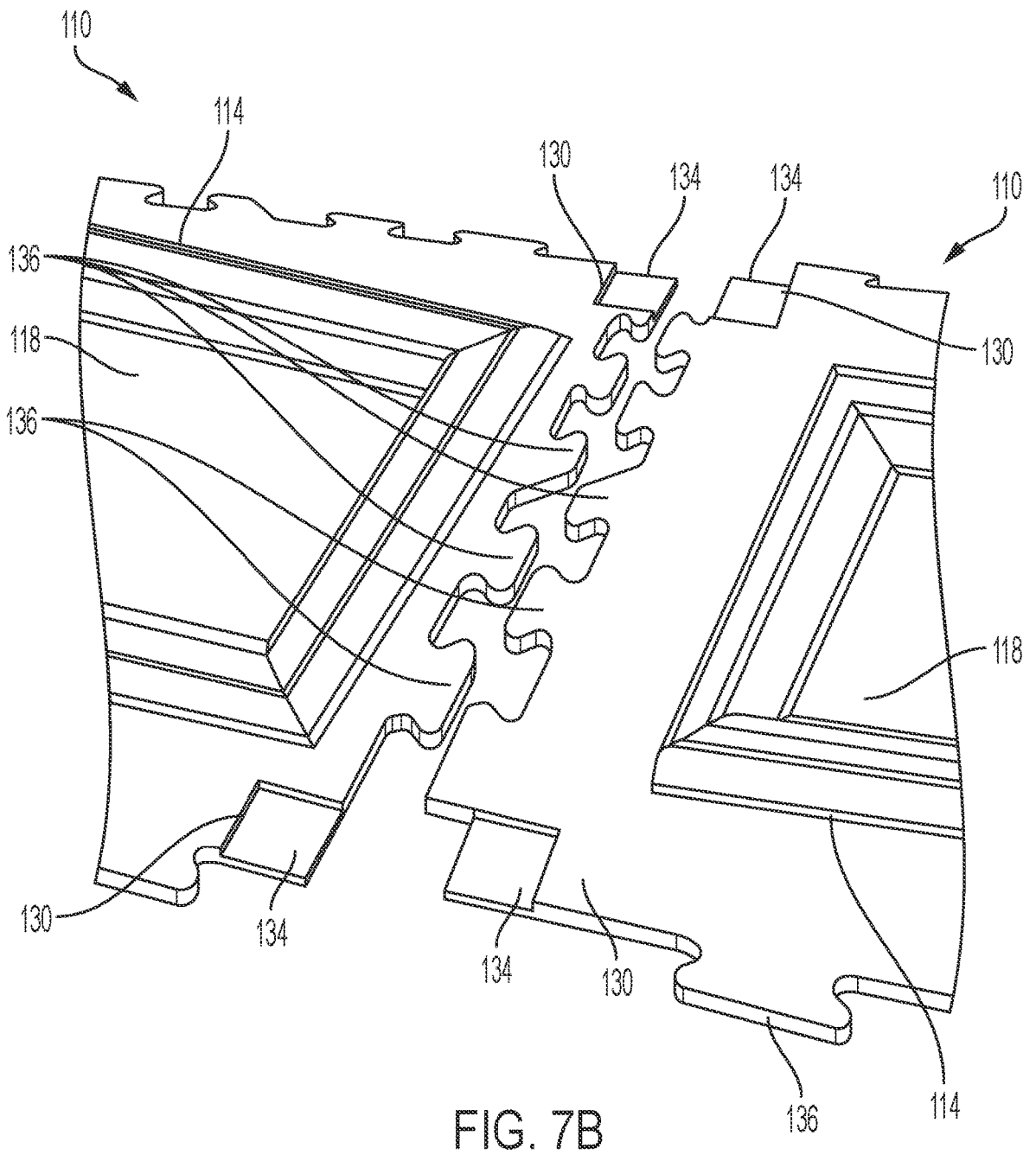
FIG. 7B is a perspective view illustrating portions of two of the floormats of FIG. 6A being secured together.
Figure 7C:
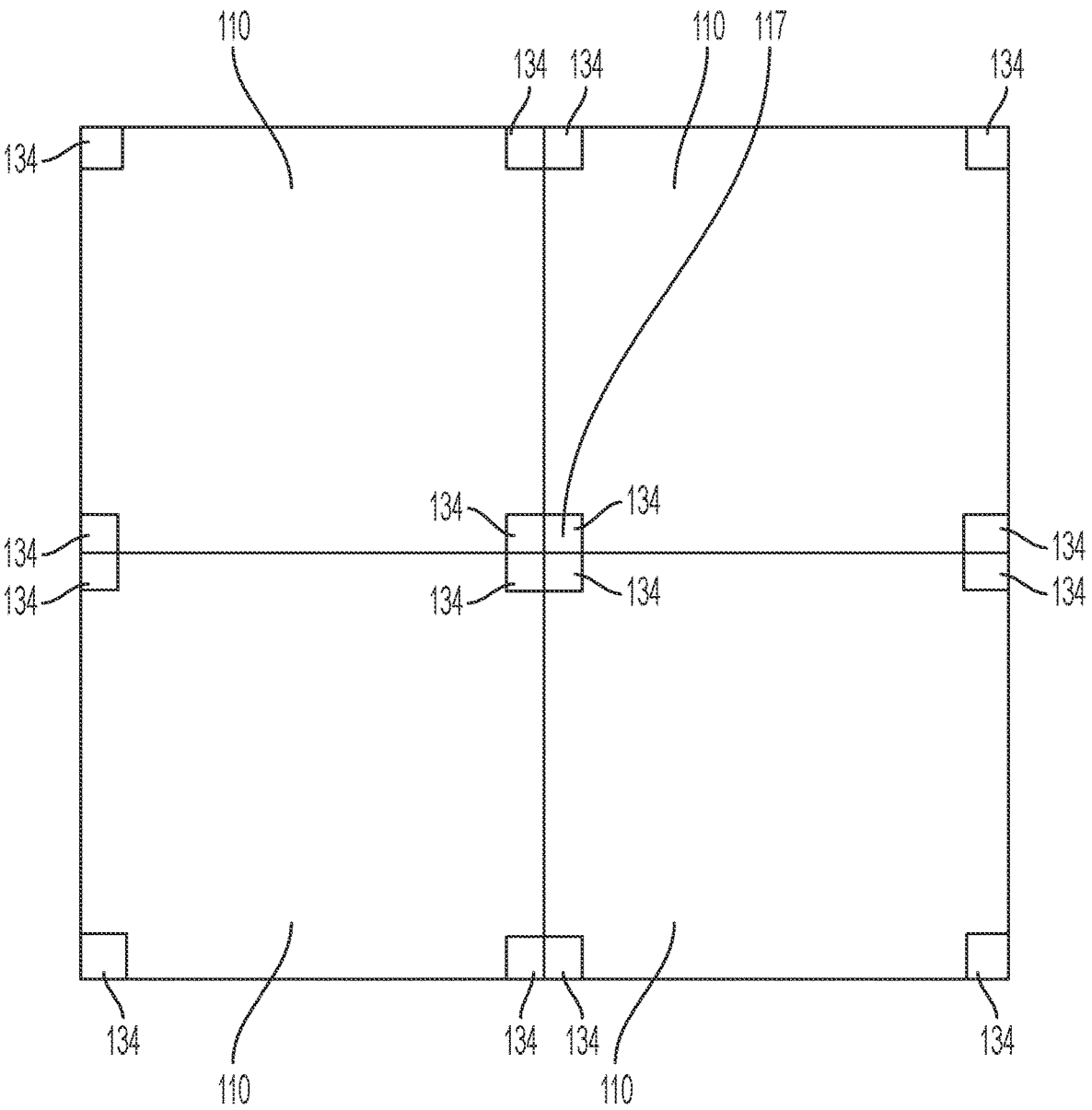
FIG. 7C is a schematic top elevation view of four of the floormats of FIG. 6A secured together.

Turning now to FIGS. 6A and 6B, a storage structure including a frame 14' according to an embodiment of the present disclosure is illustrated. Frame 14' is designed to efficiently store a plurality of stackable containers 310 (shown in FIGS. 9-13) and may be substantially similar to frame 14 but for the differences discussed hereinafter. Notably, the cross-sectional area of each shaft of frame 14' is larger relative to the dimensions of container 310 compared to the shafts of frame 14 relative to container 10. In this regard, when the stacks 12' of containers 310 are housed within frame 14', a small gap (e.g., space) exists between an outer surface of the container and vertical members 16', as is shown in FIG. 6B. FIG. 7A illustrates a rectangular floormat 110 designed to assist in the construction of a frame, such as frame 14, frame 14', or the frame of another grid-based storage system. Floormat 110 has a perimeter sized to match the desired "grid space" of frame 14 or frame 14'. The perimeter of floormat 110 defines a notch 130 at each corner of the floormat. Notch 130 may be L-shaped, or in the form of a right angle, as shown in FIGS. 7A-7C, and designed to receive a corner (and half of each edge adjacent the corner) of a lower end of the vertical member 16 of frame 14 or the lower end of the vertical member 16' of frame 14'. Thus, when four floormats 110 are positioned in a substantially rectangular arrangement, as shown in FIG. 7C, the notches 130 collectively form a recess 117 at the junction of the four floormats. Recess 117 is shaped and sized to receive a leveling foot (shown in FIGS. 19A-19C) and/or the lower end of the vertical member 16 of frame 14 or the lower end of the vertical member 16' of frame 14' itself. In this regard, when floormats 110 are arranged in a side-by-side configuration, recesses 117 will be automatically formed in a grid-like pattern and each recess will demarcate the precise location at which vertical member 16 or a vertical member 16' should be secured, thereby enabling the vertical members to be quickly and efficient assembled. It will be appreciated that floormats 110 avoid the need for a worker to separate and tedious measurements and generally expedite construction of frame 14 or frame 14'.

Referring back to FIG. 7A, floormat 110 may also include a lip 114 that defines a pocket 118 shaped and sized to closely receive a lower end of stackable container 310. Floormat 110 can therefore be placed at the bottom of any shaft in frame 14' to secure the lowermost container of the stack and constrain the stack 12' of containers to a central location within the shaft even when the stack of containers are not constrained by vertical members 16'. The inner surface 122 of lip 114 may be tapered inwardly from the upper end of the inner surface towards the lower end of the inner surface to receive the lower ends of the container and to compensate for and correct slight misalignment of a container that is deposited on floormat 110. Instead of lip 114, floormat 110 may alternatively have a central cutout that defines pocket 118. In this example, floormat 110 centers and constrains the stack 12' of containers 310 within a shaft in the same manner as the floormat with lip 114 but can be manufactured using less material and, thus, at a lesser cost.

Floormats 110 may be provided with either or both lip 114 (or a central cutout) and notches 130. That is, notches 130 and lip 114 (or a central cutout) are individually useful, and need not be implemented together as illustrated. However, when used collectively in connection with frame 14', these features gain additional utility because the notches assist in quickly and accurately assembling the frame while the lip 114 (or central cutout) secures and aligns the stack 12' of containers 310 relative to the shafts of the of frame. In this regard, floormats 110 may be placed edge-to-edge in in a side-by-side tiled patter upon the warehouse floor, as shown in FIG. 7C and described above, to define a grid of recesses 117 for the efficient placement of the vertical members and to centrally align pocket 118 within the resulting grid spaces of the frame. Optional fastener holes 138 enable floormats 110 to be secured to the underlying surface, such as the warehouse floor, after placement to prevent floormats 110 from sliding or otherwise moving during construction of the frame and/or use of the storage system.

Mats 110 may optionally also include an underlying rigid plate 134. For example, if an overlying portion of floormat 110 is constructed of a relatively flexible material such as plastic, rubber, or any other polymer, plates 134 may be constructed of metal, such as titanium, aluminum, any variety of steel, another metal or any other relatively rigid material such as plastic. The rigidity of plates 134 may compensate for any irregularities or softness of a surface upon which floormats 110 may be distributed. For example, the floor of a warehouse, may have uneven or damaged flooring that could cause a flexible material to bend or otherwise alter in shape. Altering the shape of floormat 110 may, in turn, result in the alteration of the precise alignment of recesses 117 and/or the location of pockets 118. In examples where floormat 110 includes a rigid plate 134, the plate may extend beyond notches 130 as illustrated, such that the plates of adjoining floormats 110 adjoin one another to collectively define a flat and rigid lower surface of recesses 117. The flat and rigid lower surface of recess 117 ensures that the stabilization feet (not shown) and/or the lower ends of vertical members 16, or vertical members 16', are supported in a coplanar manner that compensates for any irregularities or softness of the surface upon which floormats 110 are distributed. Shims, plastic flexures, or springs may be positioned underneath certain corners of plate 134 to level floormat 110 when the floormat is disposed on an uneven surface.

In one embodiment, as shown in FIG. 7B, floormats 110 may also be provided with keyed or interlocking structures 136 designed to lock the floormats together and constrain each floormat 110 relative to neighboring floormats. Interlocking structures 136 of the illustrated arrangement are teeth 110, which may optionally have mutually dovetailing shapes as illustrated, but alternative types or shapes of interlocking structures 136 may be provided along some or all of the peripheral edges of floormats 110 or elsewhere along the floormats.

Figure 8A:
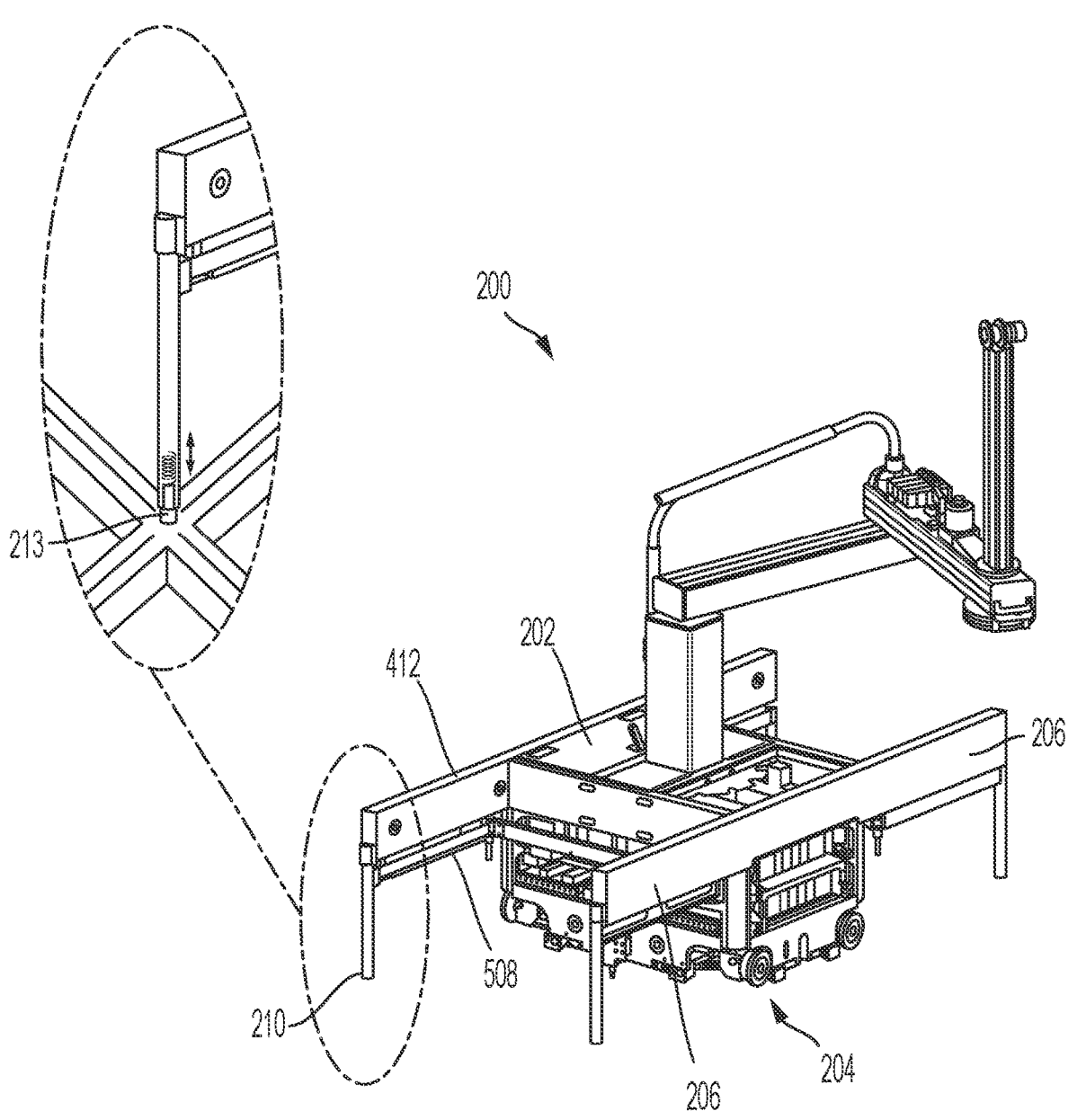
FIGS. 8A and 8B are perspective and top elevation view of a mobile manipulator robot including a container retrieval device having arms and a grapple according to an aspect of the present disclosure.
Figure 8B:
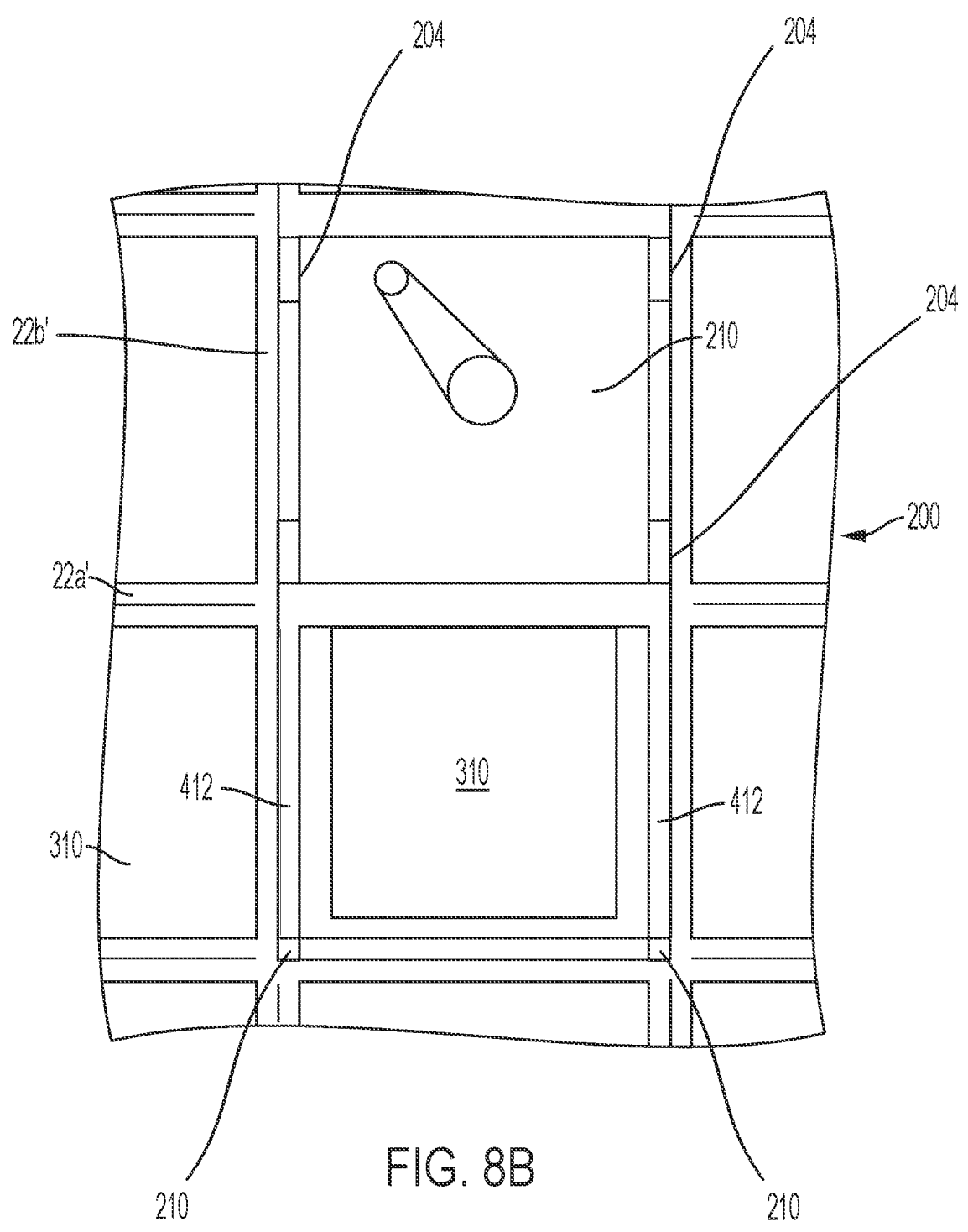

FIGS. 8A and 8B depict a mobile robot 200 (sometimes referred to hereinafter simply as a "robot") according to an embodiment of the present disclosure. Robot 200 includes a body 202, a wheel assembly 204 arranged to move the body along rails 22a, 22b or rails 22a', 22b' and a container retrieval device 206 for extracting containers stored within frame 14 (FIGS. 1-5), frame 14' (FIGS. 6A and 6B), or the frame of another storage structure. In certain embodiments, robot 200 may additionally include a robotic arm for picking and packing inventory items and may be substantially similar to the pick-and-pack robots disclosed in U.S. Patent Publication No. 2021/0032034, incorporated in its entirety herein by reference, except for the differences in the robot's container retrieval device as described in further detail hereinafter. Container retrieval device 206 includes a pair of support arms 412 (FIG. 14) affixed, or removably connectable to vehicle body 202, and a three-sided grapple 508 (FIGS. 15A-15C) configured to secure and lift a container.

Unlike the gripper plate 44 of load handling device 30, the three-sided grapple 508 of robot 200 is arranged to engage an "engagement feature" provided between the rim of the container and the bottom of the container (e.g., on a lateral side of the container). In this regard, the grapple can be lowered into the gap and around a stack of containers before it is brought into engagement with the engagement feature on the container to allow the robot to lift a plurality of bins in a single lift (e.g., the bin the grapple is engaged with and all bins sitting on top of that bin). It will be appreciated that because gripper plate 44 of load handling device 30 is designed to engage an upper surface of container 10, the gripper plate is incapable of extracting more than one container at a time. Instead, the containers must be extracted consecutively (e.g., one after another).

The support arms 412 of container retrieval device 206 may be positioned at any height on vehicle body 202, but in the illustrated example, the support arms are positioned at least one bin-height above the lower end of wheel assembly 204. Put another way, when robot 200 is positioned on the grid, the support arms of container retrieval device 206 will be at least one bin-height above rails 22'. Thus, if a single container 10 protrudes above the rails 22' (as may sometimes be the case, for example, when an order container is temporarily released on the top of a stack of containers and/or a storage container is temporarily stored during a digging operation), container retrieval device 206 will be able to pass over the protruding container in any direction so long as the container does not interfere with the body 202 of robot 200. Support arms 412 of container retrieval device 206 preferably extend from the body 202 of robot 200 a single grid-space so as to not interfere with a robot positioned two grid spaces away from the body of the robot.

In some embodiments, container retrieval device 206 includes stabilizing supports. For example, as shown in FIG. 8B, container retrieval device 206 may also include one or more support legs 210 for supporting and stabilizing support arms 412, which in turn, prevents robot 200 from tipping over due to the robot's increased polygon of support. Each support leg 210 is coupled to a respective support arm 412 and extends downwardly to contact rails 22 or rails 22'. A spring-loaded ball-in-socket bearing 213, roller, brush or similar device, may be provided at a lower end of each support legs 210 to reduce friction and allow bearing to slide, roll or otherwise move along the drive surfaces of rails 22 or rails 22'. As shown in FIGS. 8A and 8B, support legs 210 are preferably located adjacent a terminal end of support arms 412 such that the support legs are spaced one-grid length from the body 202 of robot 200. In this manner, when the wheels of robot 200 are positioned at the corners of a grid space, support legs 210 are also positioned at the corners of a grid space (as shown in FIG. 8B). This construction allows support legs 210 to transition from travelling along rails 22a, 22a' to traveling along rails 22b, 22b' (and vice-versa) as the wheels of wheel assembly 204 are pivoted and allows support legs 210 to be in constant contact with rails 22 or rails 22'.

It will be appreciated that support arms 412 are supported at two locations: (1) at a first end by body 202; and (2) at a second location by support legs 210. Stabilizing container retrieval device 206 at two locations prevents robot 200 from tipping, when the container retrieval device is carrying a heavy payload, for example, when lifting multiple containers. However, in other instances, support legs 210 may be configured to retract, pivot or otherwise move away from rails 22 or rails 22', while robot 200 is traversing about the rails, and then configured to engage the rails when additional support is desired such as during a lifting operation and/or when container retrieval device 206 is carrying one or more containers. When support legs 210 are designed to engage and disengage rails 22, 22', the support legs may be provided anywhere along the length of the support arms 412.

Figure 8C:
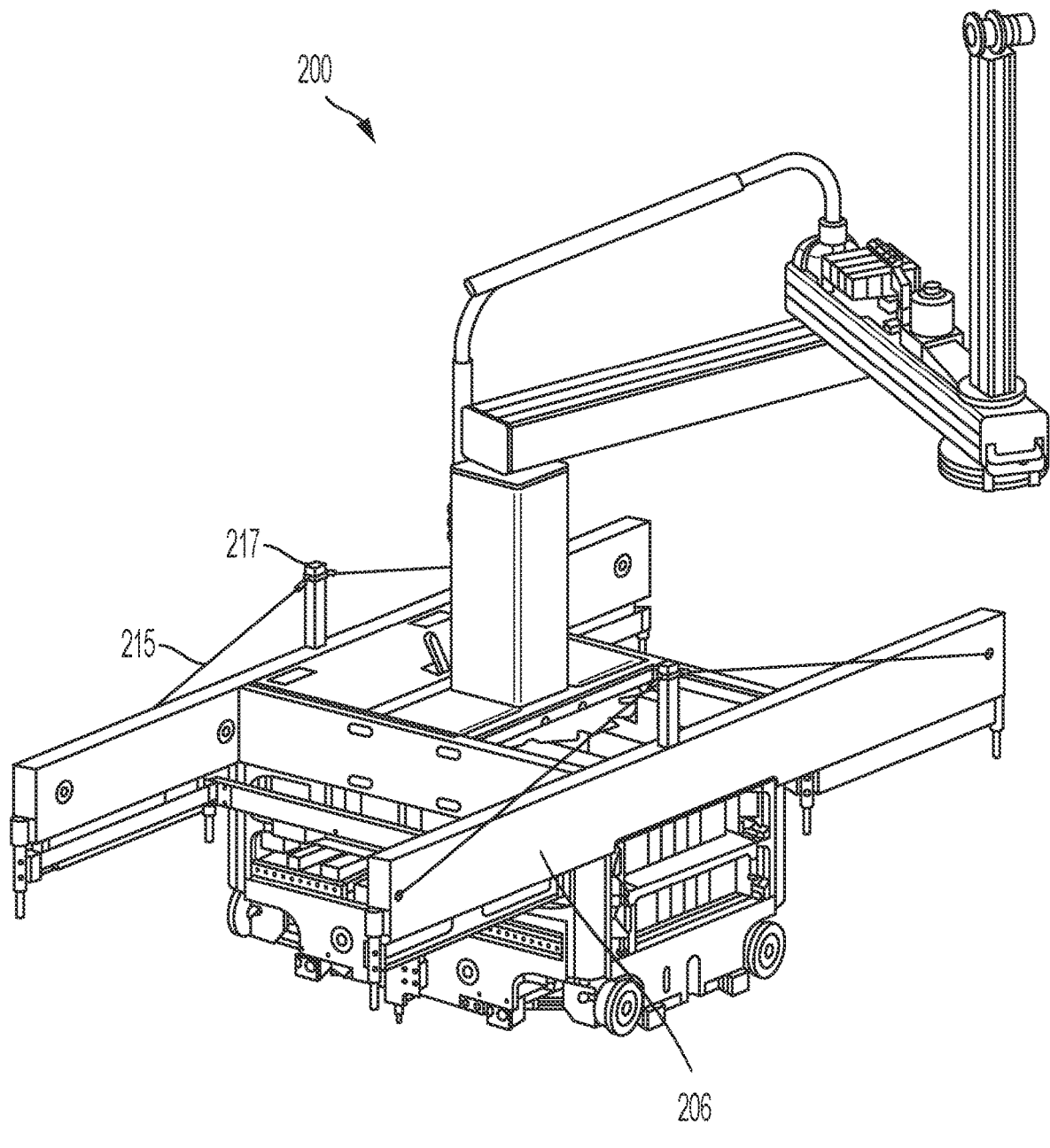
FIG. 8C is a perspective view of a mobile manipulator robot including a container retrieval device having arms and a grapple according to another aspect of the present disclosure.

The container retrieval device 206 of robot 200 may be supported at more than one end by any other known mechanism. For example, as shown in FIG. 8C, suspension wires 215 may be tensioned between a tower 215 extending from the body 202 of the robot and support arms 412. Suspension wires 215 are designed to stabilize support arms 412 from above while stabilization legs 210 stabilize the support arms from underneath.

Figure 9:
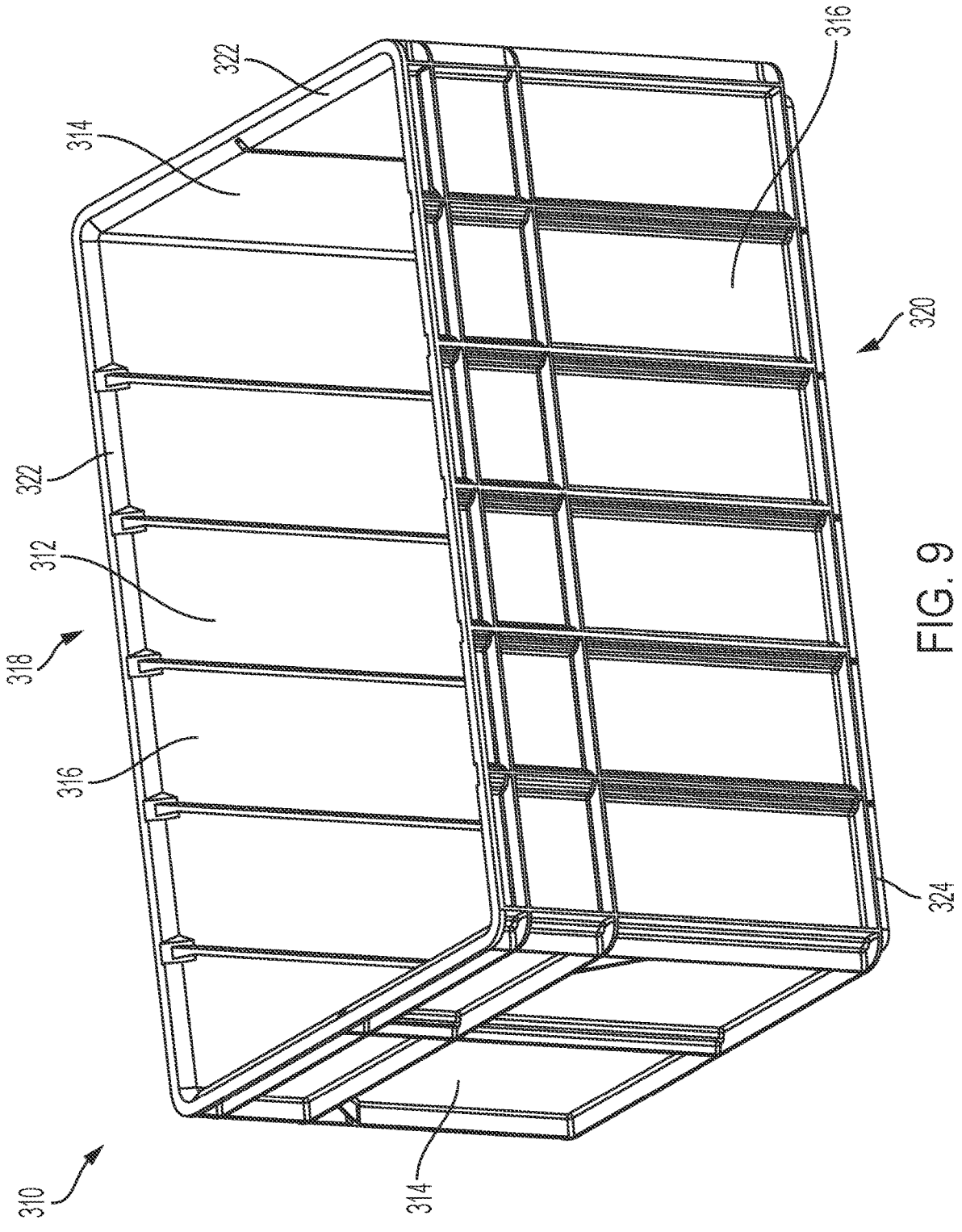
FIG. 9 is a perspective view of a stackable bin according to an aspect of the present disclosure.
Figure 10:
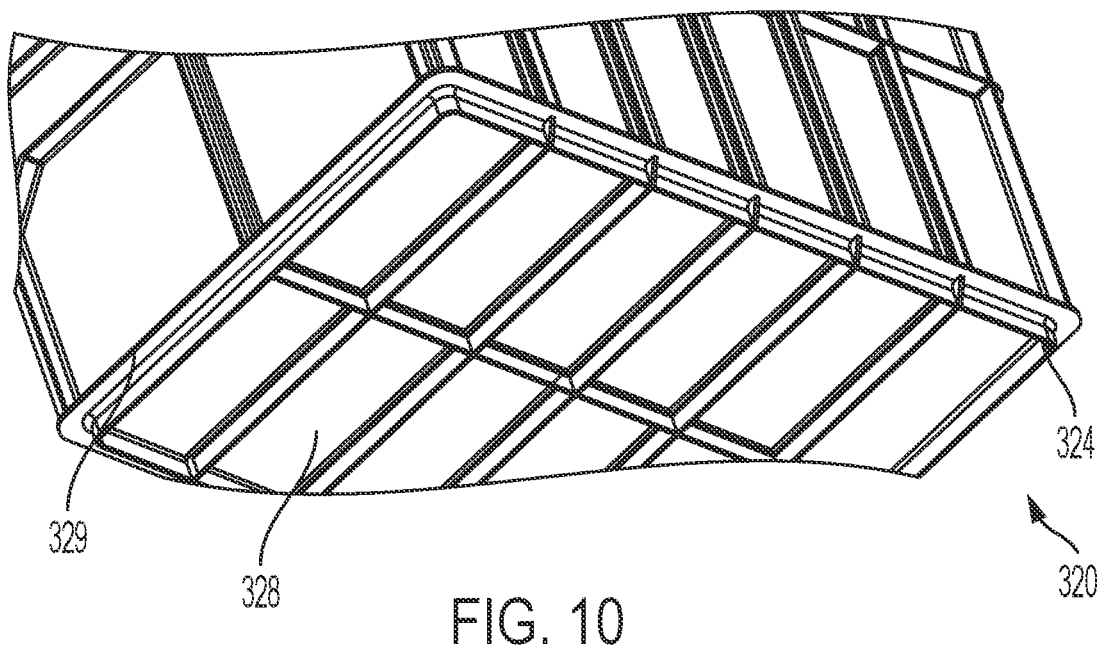
FIG. 10 is a partial perspective view of a bottom surface of the bin of FIG. 9.
Figure 11:
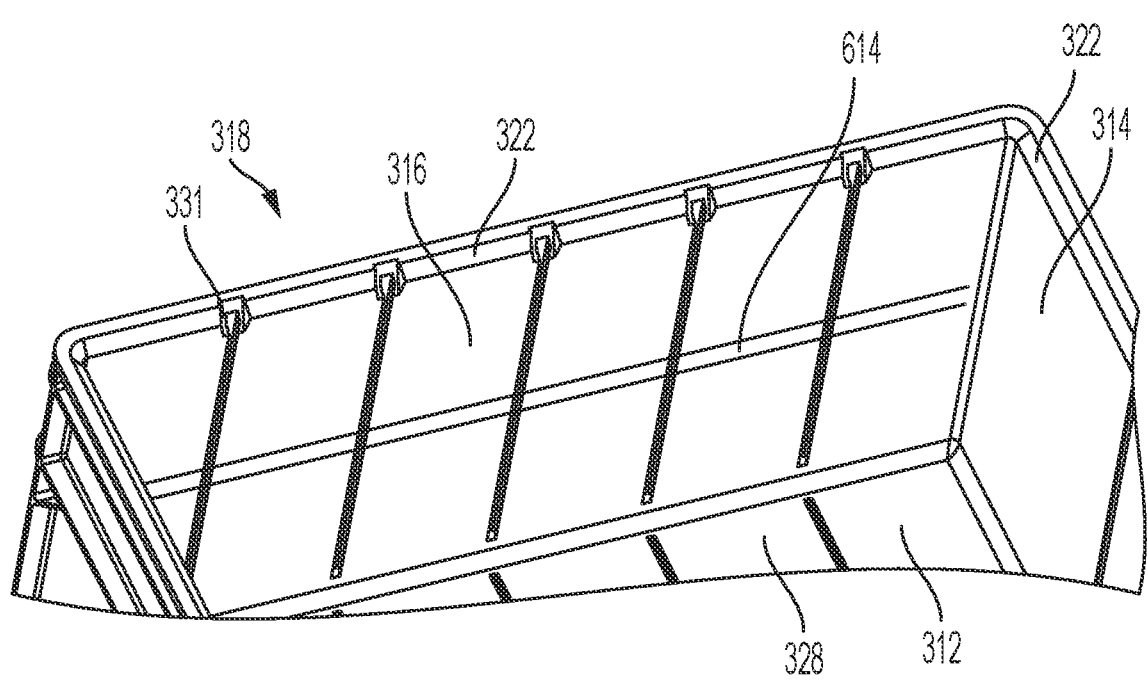
FIG. 11 is a partial perspective view of an upper end of the bin of FIG. 9.

With reference to FIGS. 9-11, container 310 (or "bin") is described in further detail. Container 310 includes a pair of opposing short walls 314 and a pair of opposing long walls 316, and is therefore rectangular in shape, although it is contemplated that the bins may be square or otherwise differ in proportion or shape from the containers illustrated in the FIGS. 9-11. Walls 314, 316 together with bottom 328 collectively define an interior space 312 for receiving and storing inventory items.

Walls 314, 316 extend from a lower end 320 of bin 310, at which bottom surface 328 is located, to an upper end 318 at which an opening of interior space 312 is formed. Each wall 314, 316 includes a chamfer 322 at an upper and inner edge. Chamfers 322 are declined from the upper end 318 of container 310 toward an interior surface of the walls of the container such that the surface area of the opening of interior space 312 is largest at the upper end of the container and gradually decreases along the length of the taper.

The perimeter of the bottom 328 of container 310 is defined by a projection 324 that is shaped and sized to fit within the interior space 312 of another container when stacked on top of that other container. In some embodiments, the projection 324 of container 310 may also be shaped and sized so as to be closely received within pocket 118 defined by lip 114 of floormat 110.

Container 310 further defines a ledge 329 extending outwardly from the upper end of projection 324. Ledge 329 is sized to substantially correspond to the upper end 318 of container 310. In this regard, when one container ("upper container") is stacked on top of another container ("lower container"), the ledge 329 of the upper container is arranged to rest flush against the upper end 318 of the lower container. The chamfer 322 and projection 324 act as alignment and nesting features that assist in the stacking of containers 310. As used herein, the term "nesting feature" encompasses a structure designed to sit inside (or receive) a corresponding structure of another container.

Figure 12:
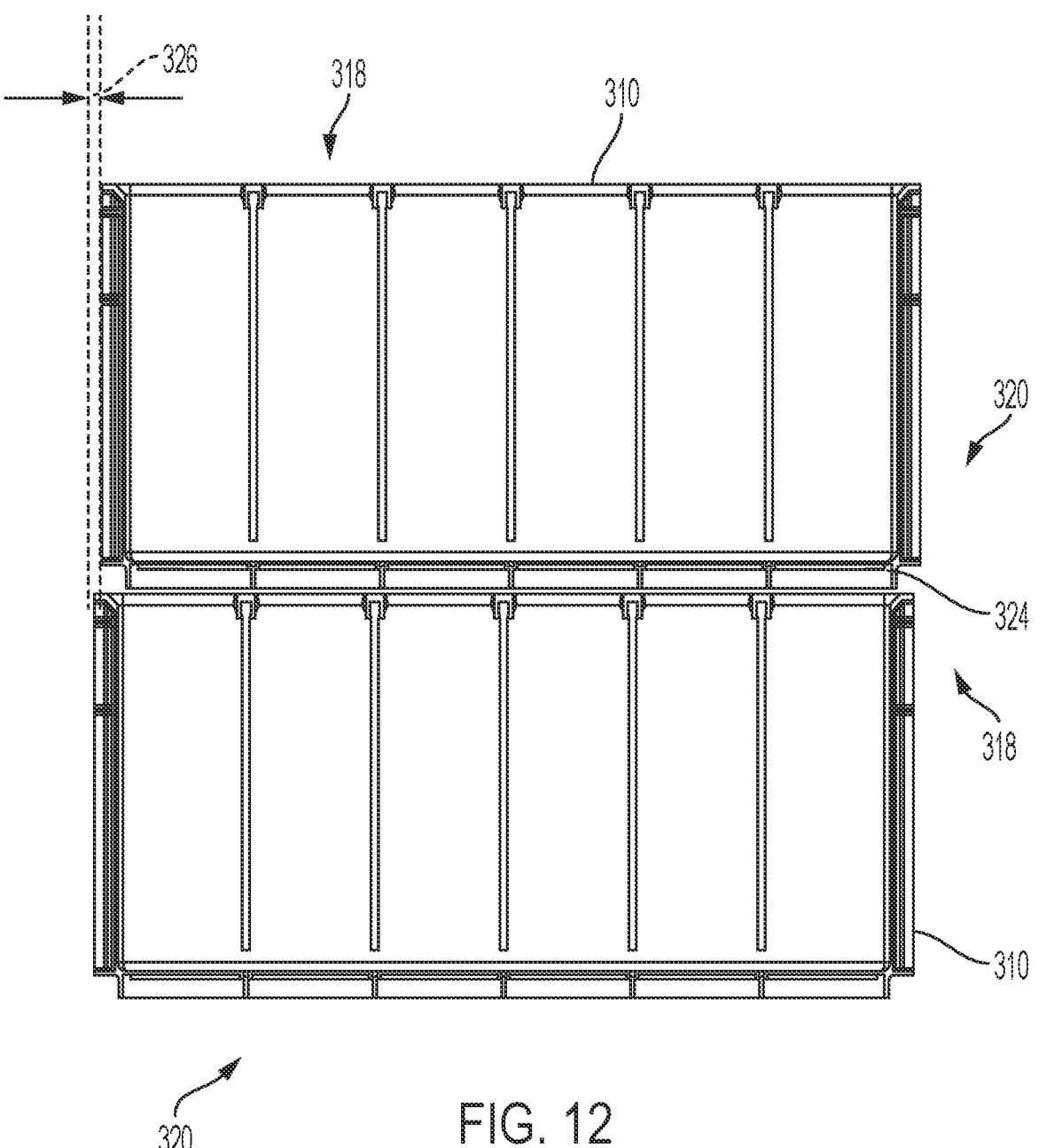
FIG. 12 is a side plan view illustrating two bins according to FIG. 9 stacked in a nested condition.

The manner in which chamfers 322 and projection 324 correct misalignment during stacking is explained hereinafter with additional reference to FIG. 12. The chamfers 322, which are not visible in FIG. 12, compensate for a misalignment 326 between an upper container and a lower container by guiding the projection 324 toward the interior space 312 of the lower container. That is, when an upper container is stacked upon a lower container with a misalignment 326, the projection 324 of the upper container will slide along the length of chamfers 322 to the projection of the upper container into the interior space 312 of the lower container to automatically correct the alignment until the ledge 329 of the upper container rests flush against the upper end 318 of the lower container. Put another way, containers 310 have self-aligning features and, therefore, do not only depend on external constraints such as components of frame 14, to align the containers into orderly stacks.

With additional reference back to FIG. 7A, the taper of lip 114 toward an interior of pocket 118 of floormats 110 is designed to align and nest the projections 324 of container 310 therein in a manner similar to the manner in which an upper container is aligned and nested within a lower container. Floormat 110 and the projection 324 of container 310 therefore cooperate to efficiently align and secure an entire stack of bins 310 within a shaft of frame 14' and, in turn, relative to a respective grid space.

Figure 13:
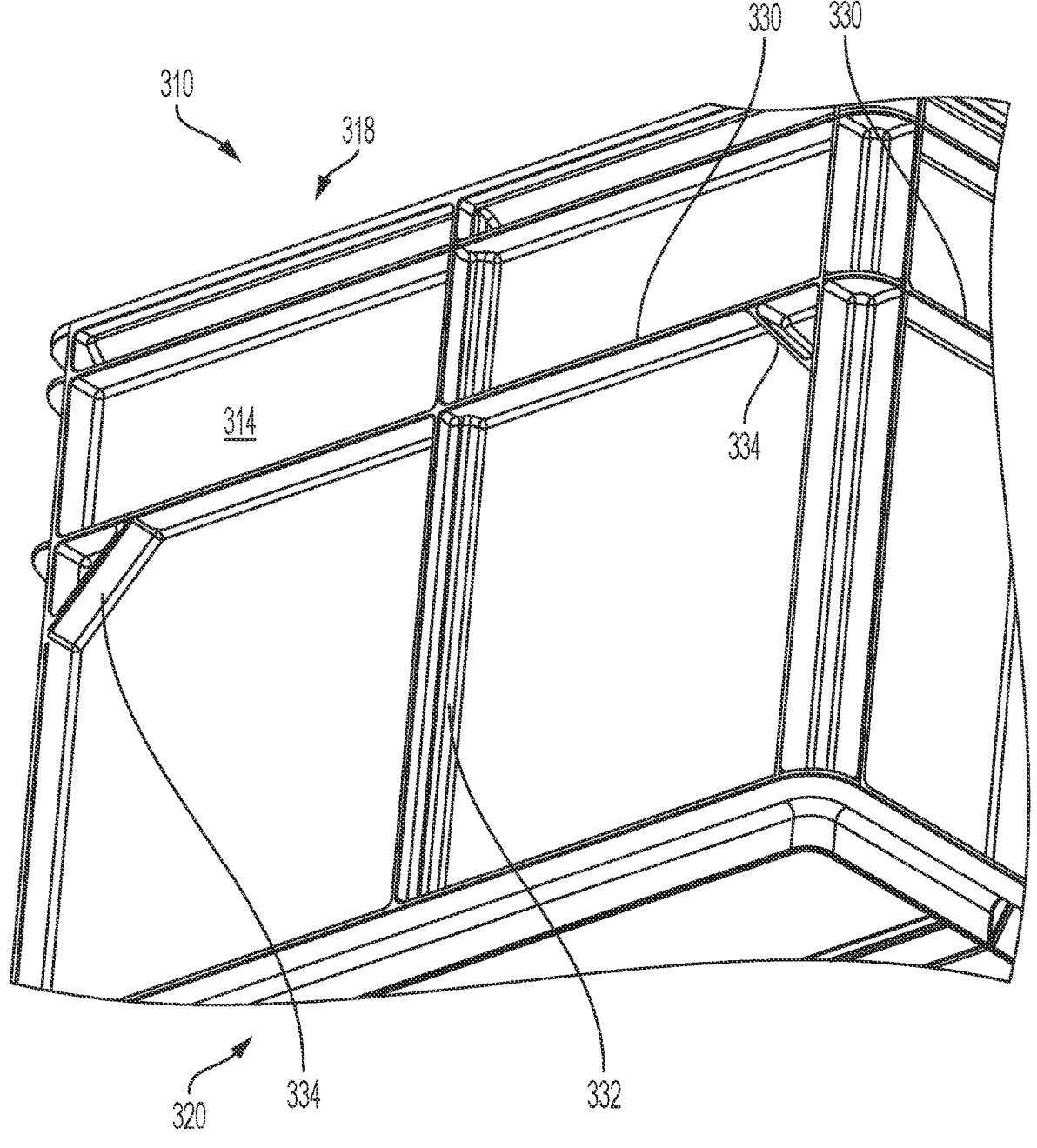
FIG. 13 is a perspective view of a sidewall of the bin of FIG. 9 having an exterior engagement feature.

Turning now to FIG. 13, the walls 314 and/or walls 316 of bin 310 also include an engagement feature 330 arranged to engage the grapple 508 of robot 200 to secure the bin to container device 206. Engagement feature 330 may be implemented along with, or separately from, the above-described nesting features (e.g., the chamfer 322 and the projection 324). In the illustrated arrangement, engagement feature 330 is a rib extending generally in a horizontal direction across an external surface of walls 314, 316 and, therefore, the rib also acts as a reinforcement member that provides rigidity to the walls. As used herein, the term "rib" refers to any structure protruding outwardly from the external surface of walls 314, 316 regardless of the shape or orientation of the structure. In other arrangements, engagement feature 330 may alternatively be formed as one or more indentations, apertures and alike defined within or extending through the walls 314, 316 of container 310.

While engagement feature 330 is illustrated in FIG. 13 as being located on walls 314 and walls 316, it will be appreciated that the engagement feature need only be provided on one of opposing walls 314 or walls 316 for the grapple 508 of container retrieval device 206 to securely fasten the container. That is, in other examples, container 310 may have an engagement feature 330 extending partly or entirely across short walls 314 or long walls 316. In this manner, the ribs, or other engagement features 330, enable the container retrieval device to engage and lift container 310 as described below.

In the illustrated example, an optional vertical rib 332 bisects horizontal rib 330. Vertical rib 332 further reinforces the structural integrity and adds rigidity to the walls of container 310. Container 310 may also optionally include angled ribs 334 at opposite ends of the horizontal rib 330. Each angled rib 334 extends from a lateral end of the horizontal rib, at an oblique angle, toward the bottom 328 of container 310. Angled ribs 334 may therefore act as an alignment feature designed to guide container retrieval device 206 into engagement with engagement feature 330.

Figure 14:
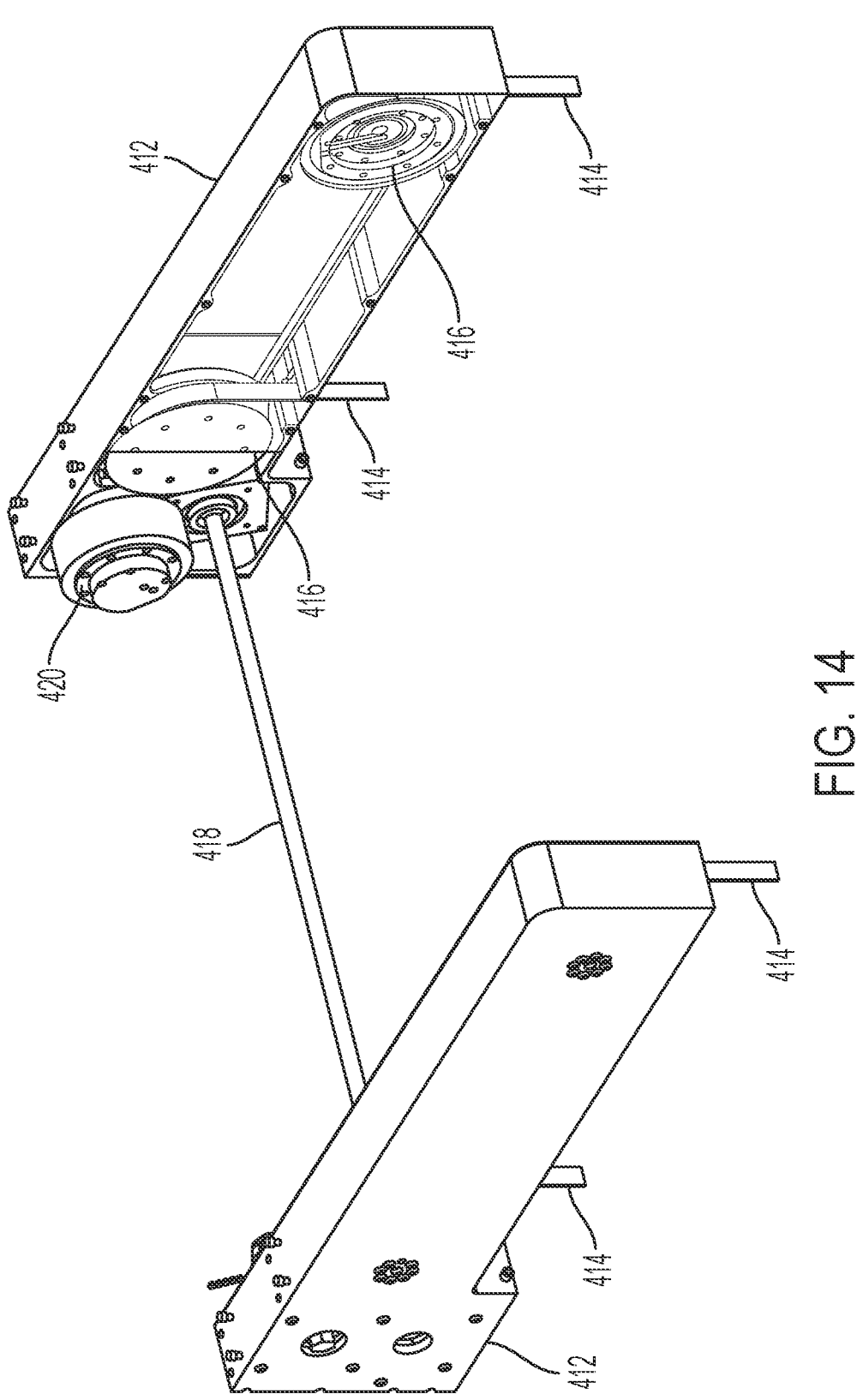
FIG. 14 is a perspective view of the arms of the container retrieval device of the robot of FIG. 8A.

FIG. 14 illustrates the support arms 412 of container retrieval device 206. Support arms 412 house spools 416, or another winding mechanism, that can be operated to wind or unwind cables 414 to lower or raise grapple 508 in a vertical direction. An encoder (not shown) may be coupled to the spool 416 or actuator on the spool to measure the position of the grapple 508 as it moves in the vertical direction. For example, as cables 414 are unspooled from spool 416, grapple 508 supported by cables 414 is lowered in the vertical direction away from arms 412. In contrast, spooling cables 414 about spool 416 will cause grapple 508 to raise toward arm 412 of container retrieval device 206.

Spools 416 may be synchronized with one another, for example, via a common drive shaft 418 extending between arms 412 as illustrated in FIG. 14. Drive shaft 418 may be driven by a torque input 420 such as a motor and may be powered and controlled by signals carried through cables 414, through a separate control cable (not shown), or wirelessly. In one example, cables 414 may be made from conductive metal strips to transfer power and electrical signals between the grapple 508 and arms 412.

Figure 15A:
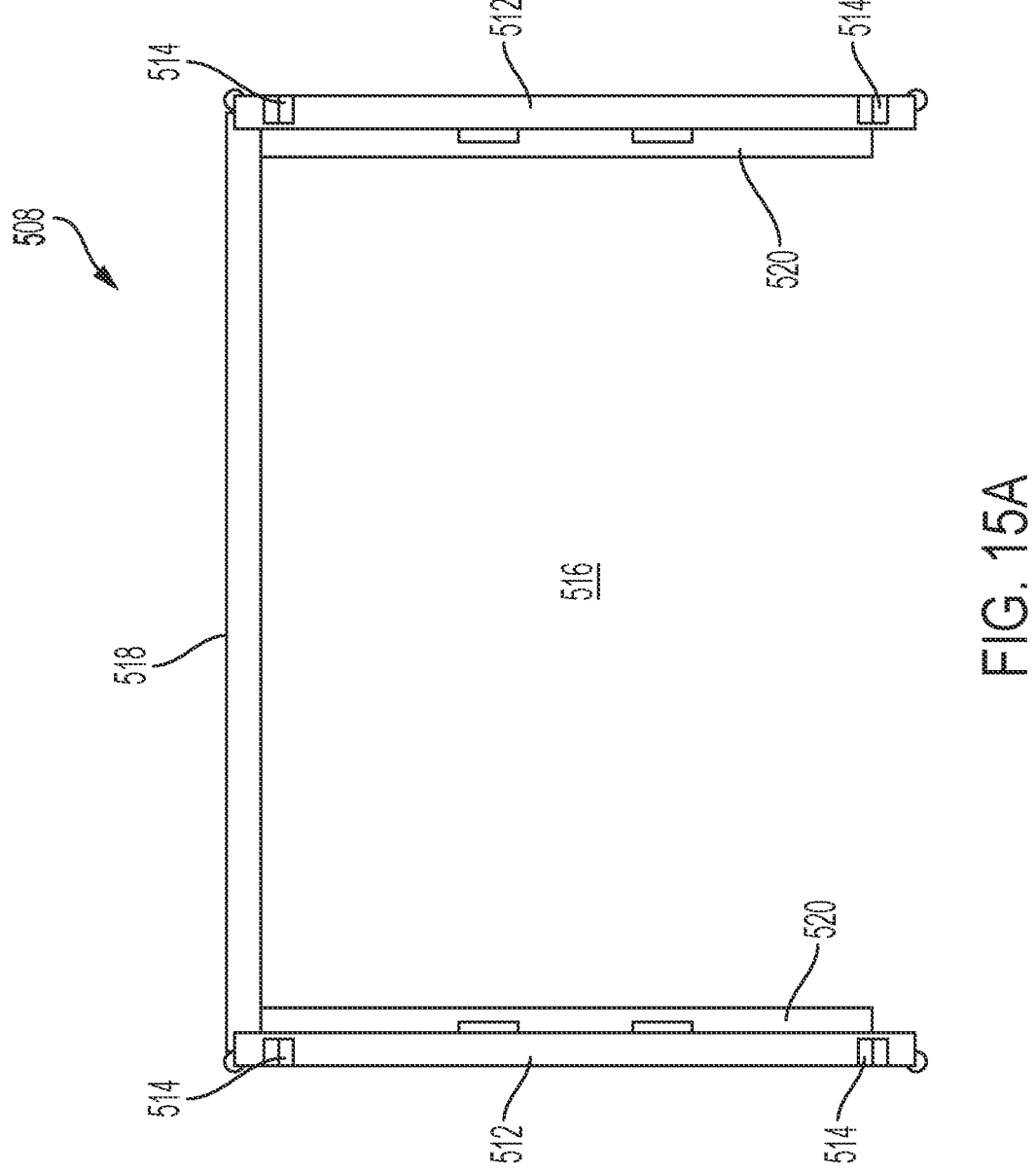
FIG. 15A is a top plan view of the grapple including grapple arms and an engagement flap.
Figure 15B:
FIG. 15B is a perspective view of the grapple frame of FIG. 15A.
Figure 15C:
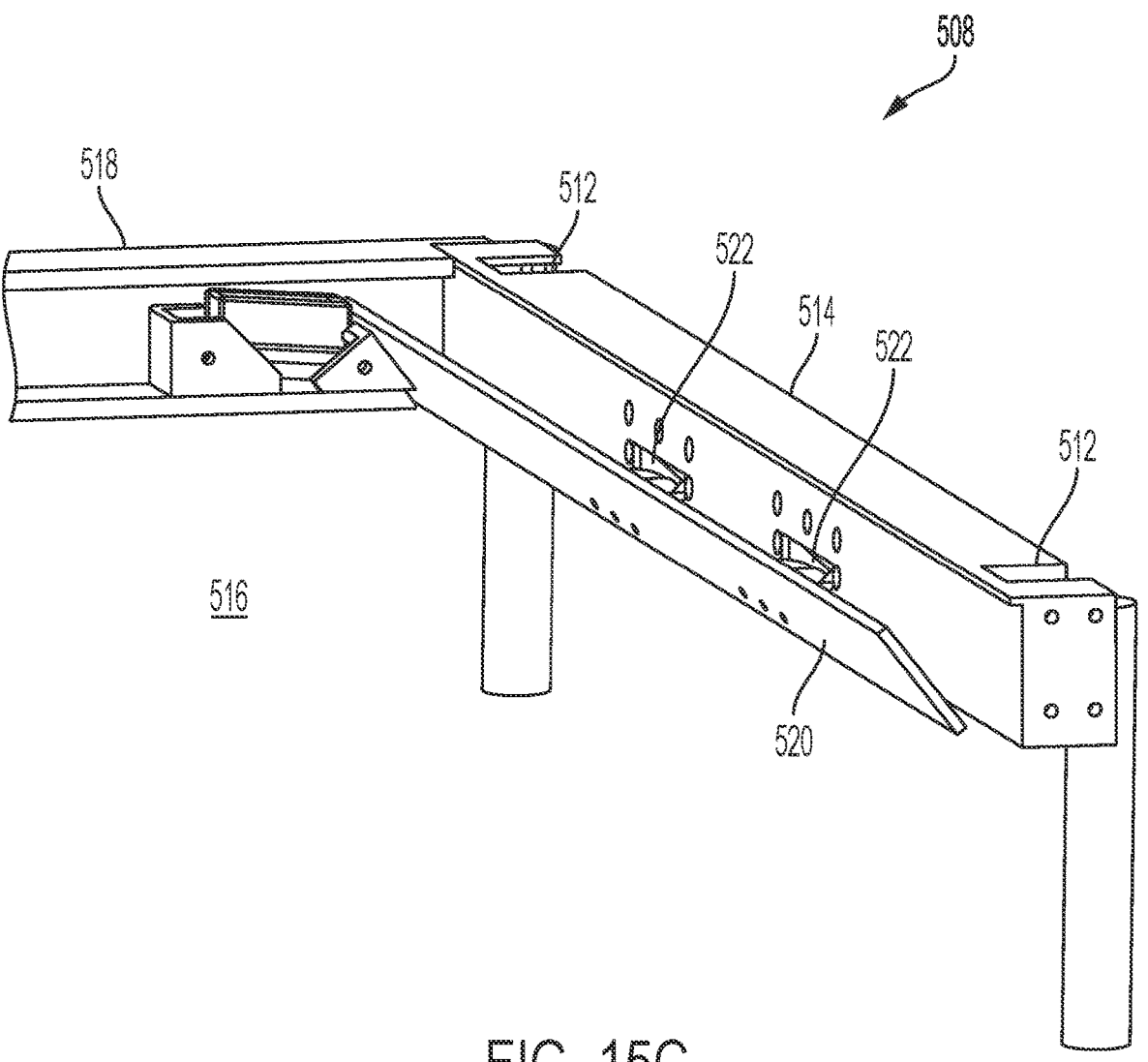
FIG. 15C is an enlarged perspective view of the grapple frame illustrating the engagement flap in a deployed condition.

Referring to FIGS. 15A-15C, grapple 508 includes a pair of grapple arms 514 and a bar 518 forming a "three-sided" plate defining a receiving space 516. An upper surface of the grapple arms 514 and/or bar 518 includes an attachment device for securing the cables 414 to the grapple 508, thereby allowing the grapple to be lowered and raised around a stack 12' of containers 310.

Each grapple arm 512 is provided with a flap 520 extending at least partially along the length of the grapple arm. Flap 520 is pivotable relative to grapple arm 512 between a deployed condition in which the flap extends away from the grapple arm and into the receiving space 516 (e.g., a position where it can engage with a bin), and an undeployed or stowed condition in which the flap rest substantially flush against its respective grapple arm 512. When flaps 520 are in the undeployed condition, receiving space 516 is larger than the perimeter of container 310, thereby allowing the grapple 508 to be lowered into the gap (e.g., space between vertical members 16' and the perimeter of the container) and around the stack of containers before the flaps are transitioned to the deployed condition and into engagement with the engagement feature 330 of a container 310 located underneath other containers. As a result, the grapple 508 is designed to extract the container 310 it is engaged with and each of the containers stacked on top of that container in a single lift.

Figure 15D:
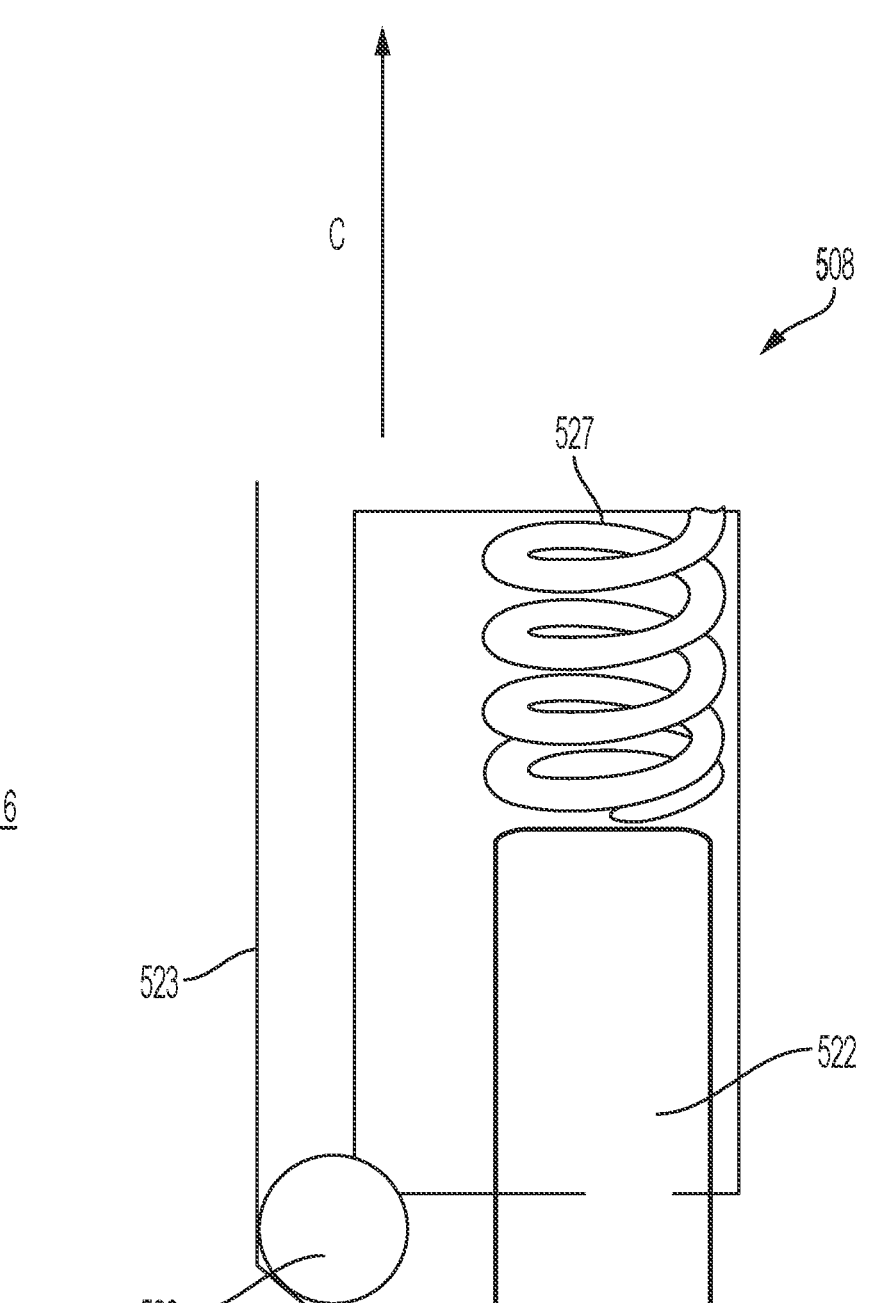
FIG. 15D is a schematic end view of a portion of the grapple frame illustrating actuation of the engagement flap.

In the illustrated example, movement of flaps 520 between the undeployed and deployed conditions is controlled by an actuator 522 disposed within grapple arms 512 and/or bar 518 configured to convert the electrical signal carried through cables 414 to rotational motion of flaps 520. FIG. 15D is a side elevation view schematically depicting a portion of grapple 508 and an example actuator 522 to illustrate a mechanism in which flap 520 may be transitioned between the undeployed and deployed conditions. Flap 520 includes an upper portion 523 situated on an interior surface of grapple arm 512 that faces toward receiving space 516 and a lower portion 521 that extends below the grapple arm 512. The lower portion 521 of flap 520. The lower and upper portions of flap 520 form an angled junction at a pivot point 528. A spring 527 secured between grapple arm 512 and an end of actuator 522 biases the actuator to engage the lower portion 521 of flap 520 and forces the lower portion of the flap away from the lower side of grapple arm 512 which, in turn, pivots the upper portion 523 of the flap into flush engagement with the inner lateral side of the grapple arm (deployed condition). Actuation of actuator 522 in the direction of arrow C compresses spring 527 and moves the lower portion 521 of flap 520 toward the lower side of grapple arm 512 which, in turn, pivots the upper portion 523 of the flap toward interior space 516 from the undeployed condition to the deployed condition. When flap 520 engages the engagement feature of a container 310 and lifts the container, the load of the container will prevent flap 520 from reverting back to its natural undeployed condition. In other words, spring 527 will remain compressed under the weight of container 330 requiring no active power or control to hold the bin. Alternatively, actuator 522 may be actuated between the deployed and undeployed conditions via active power to control and manipulate any of the containers described herein.

Referring generally to FIGS. 14A-14D, grapple arms 512 are spaced such that when flaps 520 are in the undeployed condition the flaps permit the grapple arms to pass around opposing sides of the containers 310 forming stacks 12' and when the flaps are pivoted to the deployed position, an upper end of the flaps is sized to engage engagement features 330 on opposite sides of the bin. In the regard, with flap 520 in the undeployed condition, grapple 508 may be lowered around a stack of bins 310 to position the grapple just below the engagement features 330 of a "target container" (the container with within the stack of containers intended to be engaged and lifted above rails 22a' and rails 22b'), at which time flaps 520 may be pivoted to the deployed condition. With flaps 520 in the deployed condition, grapple 508 may then be raised to move an upper surface of flaps 520 into engagement with the lower surfaces of engagement features 330. If flaps 520 are slightly misaligned relative to engagement features 330, the flaps may slide along angled ribs 334 to realign and guide the flaps into engagement with the engagement features.

It will be appreciated that because container retrieval device 206 does not have an upper surface, when grapple 508 engages a target container 310 positioned underneath one or more other containers ("non-target containers") and spool 416 is wound to raise the target container to a location between arms 412, the non-target containers may be raised in a vertical direction through arms 412. As a result, the container retrieval device 206 of robot 200 is arranged to extract one or more containers from the frame in a single lift, thereby allowing robot 200 to dig in a much more efficient manner than its counterpart load handling device 30. Moreover, the fact that grapple 508 is three-sided (e.g., the grapple has an open lateral side) allows robot 200 to extract a stack of containers 310 and to drop the stack of containers on top of any other stack of containers (even if it one or more of the containers will project above rails 22a' and rails 22b') while allowing robot 200 to drive in an opposite direction of the open end of grapple 508 to disengage the grapple plate from the stack of containers. Put differently, if grapple 508 defined an enclosed aperture, it would not be possible to disengage from a container. In this regard, extracted containers would need to be redeposited entirely beneath 22a' and rails 22b'. Additionally, the "open top" between support arms 412 allows goods to be picked from and/or packed into a container secured by the container retrieval device. It will be appreciated that inventory items cannot be placed into or removed from a container 10 secured underneath the cantilever arm 44 of load handling device 30.

Figures 16A, 16B:
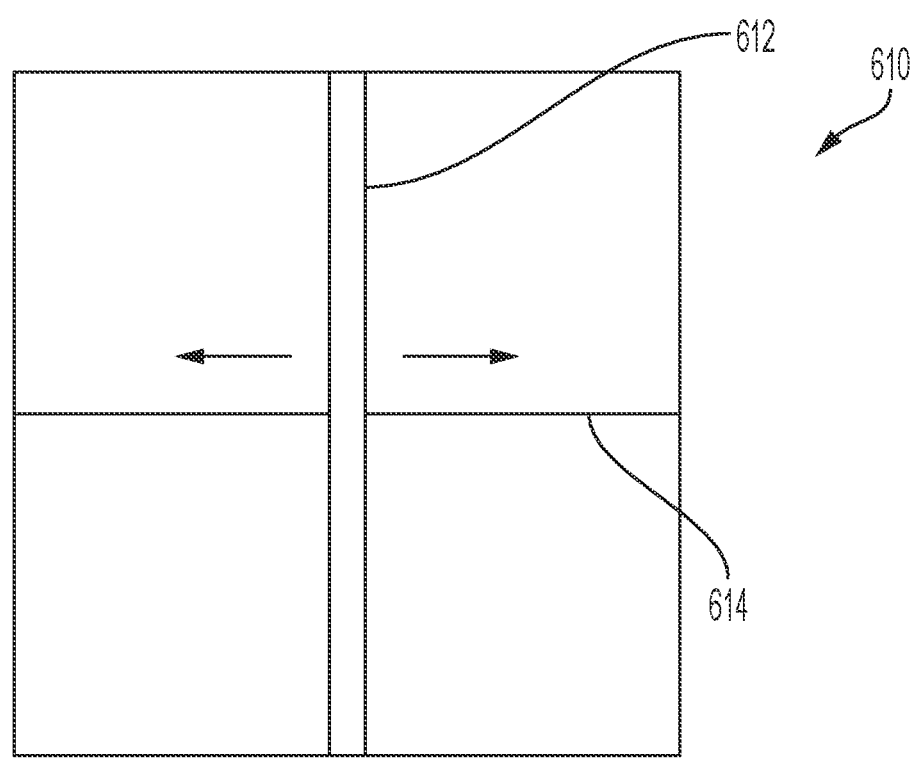
FIGS. 16A and 16B are schematic top elevation views of bins having movable partitions according to another aspect of the disclosure.

FIGS. 16A and 16B illustrate bins 610, 620 including any or all of the features of container 310 and additionally including moveable partitions. Bin 610, shown in FIG. 16A, includes a slidable partition 612 dividing an interior space of bin 610 into first and second sections. In this regard, the relative volumes of the first and second subspaces can be adjusted by sliding partition 612 laterally in the direction of the arrows within the interior space of bin 610. Partition 612 may also be slid entirely to one side of bin 610 or to the other side to effectively eliminate the division of the interior space. Partition 612 may be constrained to move along a predefined path by horizontal groove 614, which extends along a bottom surface of the interior space of bin 610 in the illustrated example. However, horizontal grooves 614 may additionally or alternatively run along an inner surface of an opposed pair of walls of bin 610. Partition 612 may include a tongue arranged to be received within a groove 614. In one non-limiting example, the tongue and groove 614 may be respectively shaped to have a dovetail fit with one another so as to prevent unintentional withdrawal of partition 612 from bin 610. In some aspects, partitions 612 are removable from the interior space of bin 610. For example, with additional reference to FIG. 11, partition 612 may be inserted into the interior space 312 of container 610 by inserting a portion of the partition, such as the tongue, into vertical tracks 331 and then sliding the partition toward the bottom 328 of container 610 until the tongue is positioned within groove 614 defined within an inner surface of the sidewall (shown in FIG. 11) which allows and guides the above described sliding movement of partition 612. Partition 612 may be removed from the interior space 312 of container 610 by aligning the tongue of the partition with vertical tracks 331 and pulling the partition away from the bottom surface 328 of the container.

Bin 620, shown in FIG. 16B, includes rotatable partitions 622, each of which is hingedly connected to an inner surface of the walls of bin 620. Partitions 622 may therefore be rotated between positions lying flat against an inner surface of a respective wall to the illustrated position wherein the free end of partitions 622 are positioned adjacent to one another to divide an interior space of bin 620 into subsections. The partitions 622 may be inserted and removed from bin 610 by sliding a tongue, or another portion of the partition, within track 331 as described above with respect to partition 612 and container 610. The tongue of partition 622 may have a cylindrical shape allowing the container to pivot within track 331. The bottom surface of the partition 622 may be roughened to create a friction force against the bottom 328 surface of container 620 to prevent unwanted movement the partition. In other examples, the bottom of partition 622 need not be roughened. The bottom surface of partition 622 may instead include a tongue or another structure arranged to be inserted into an arced groove within the bottom 328 of container 620 to guide the pivoting movement of the partition and to prevent unwanted movement thereof. In aspects in which the partitions 612 of bin 610 and the partition 622 of bin 620 are removable from their respectable container and/or movable within their respective containers, it is envisioned that the partitions may be moved and/or removed by an operator, robot 200 and/or an automated control such as a processor system.

The containers 610, 620 and their respective partitions 612, 622 may optionally be provided with optical differences to enable a robot or computer system to optically distinguish the bins from the partitions and, in turn, determine the state of the partitions. For example, bins 610, 620 may be different in color than partitions 612, 622, and the partitions may be different in color from one another. In one aspect, the bins 610, 620 and partitions 612, 622 may be provided with a matte finish or particular surface finish to reduce glare to improve such optical distinction, since glare interferes with color differentiation in some computer systems and optical devices.

Figure 17:
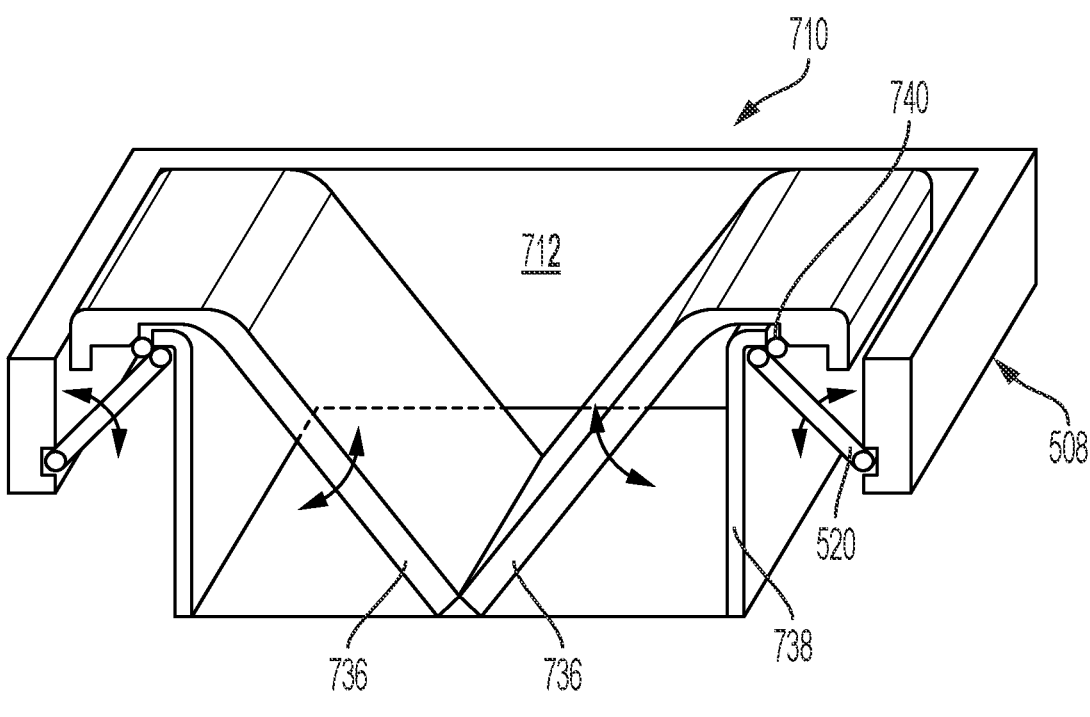
FIG. 17 is a schematic perspective view of a variant container having actuatable bomb bay doors being actuated by the engagement flap of the container retrieval device of FIG. 15A.

FIG. 17 illustrates a variant container 710 having bomb bay doors 736 that are movable between a closed condition and an open condition. Variant container 710 may include any or all of the features described above with respect to container 310 and the features discussed hereinafter. A sidewall 738 surrounds bomb bay doors 736. The sidewall and the bomb bay doors collectively define an interior space for receiving and storing inventory items. The bomb bay doors 736 may be spring loaded and biased to the closed condition to house items within the interior space of container 710. Although the bomb bay doors 736 are illustrated as sloped walls in FIG. 17, the bomb bay doors may also be formed as an openable bottom surface of container 710.

The rim of container 710 protrudes laterally outwardly from an upper end of sidewall 738. A knob 740, or other protrusion, is provided on an underside of the rim and designed to engage with flap 520 to permit the flap to actuate and open the bomb bay doors, which will, in turn, dump inventory from the interior space 712 of container 710.

Use of container retrieval device 206 to actuate and dump inventory from variant container 710 will now be described. The grapple 508 of container retrieval device 206 may be lowered around container 710 before flap 520 is actuated to the deployed condition and guided toward a "contact feature" such as knob 740. With container 710 secured to grapple 508, the wheel assembly 204 may then guide robot 200 across the rails 22' of frame 14' to another location, for example, over another container. The flap 520 may then be actively actuated to the undeployed position, which will overcome the spring-loaded force holding bomb bay doors 736 in the closed position, which will cause the bomb bay doors to open and the inventory items to be dumped into the desired container. While variant container 710 is described herein as being actuated by flap 520, it will be appreciated that the bomb bay doors may be actuated by mechanisms other than the flap, for example, another actuator located on the container retrieval device, on the body of the robot or on the support arms of the robot.

Figure 18:
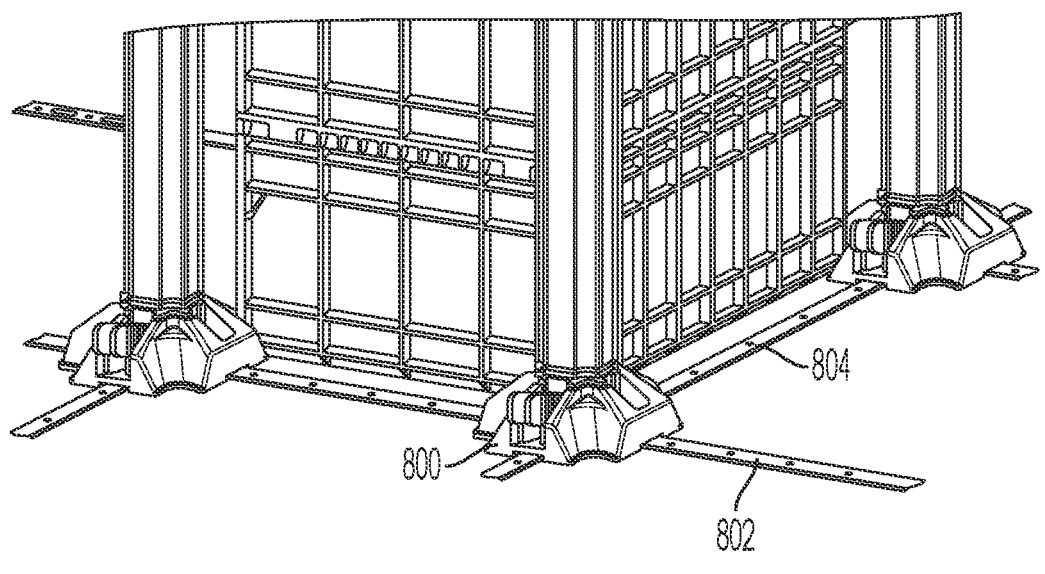
FIG. 18 is a perspective view of feet centering and leveling the stackable containers of FIG. 9.

FIG. 18 illustrates a foot 800 according to an embodiment of the present disclosure. Foot 800 may be used in conjunction with floormat 110, or independently of the floormat, to level frame 14' and center container 310 within the footprint of a respective grid space. When foot 800 is used in conjunction with floormat 110, the foot may be placed within each recess 117 defined by four adjacent floormats. Alternatively, when foot 800 is used independently of floormat 110, a track 802 configured to secure the foot may be arranged in a "grid-like" pattern on the floor of the warehouse before the foot is secured to the track, for example, by snap-fitting, teeth or puzzle fitting, peg-in-hole fitting, or friction-fitting a portion of the foot into engagement with the track.

Figure 19A:
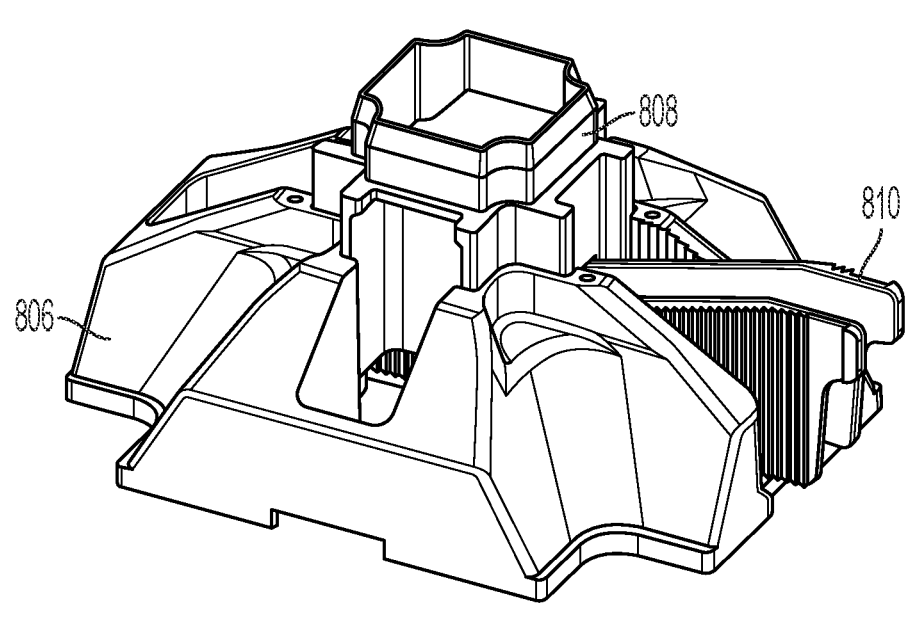
FIG. 19A is a perspective of the foot of FIG. 18.
Figure 19B:
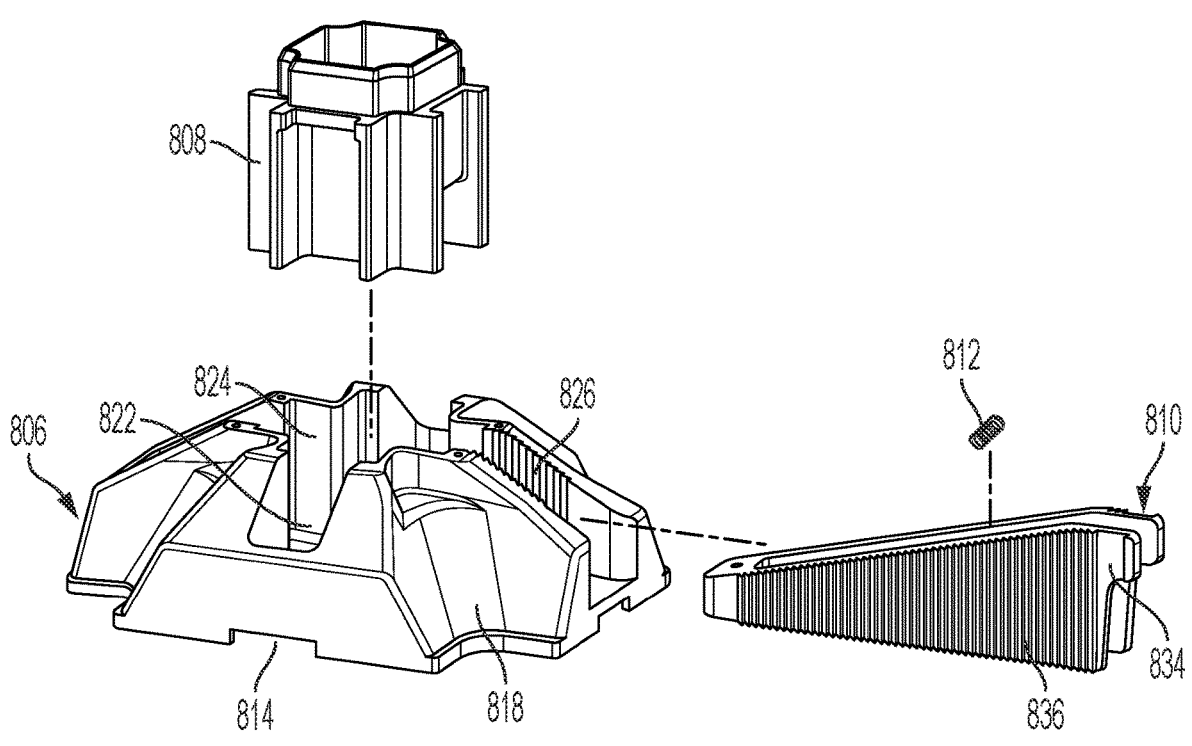
FIG. 19B is an exploded view of the foot of FIG. 19A.
Figure 19C:
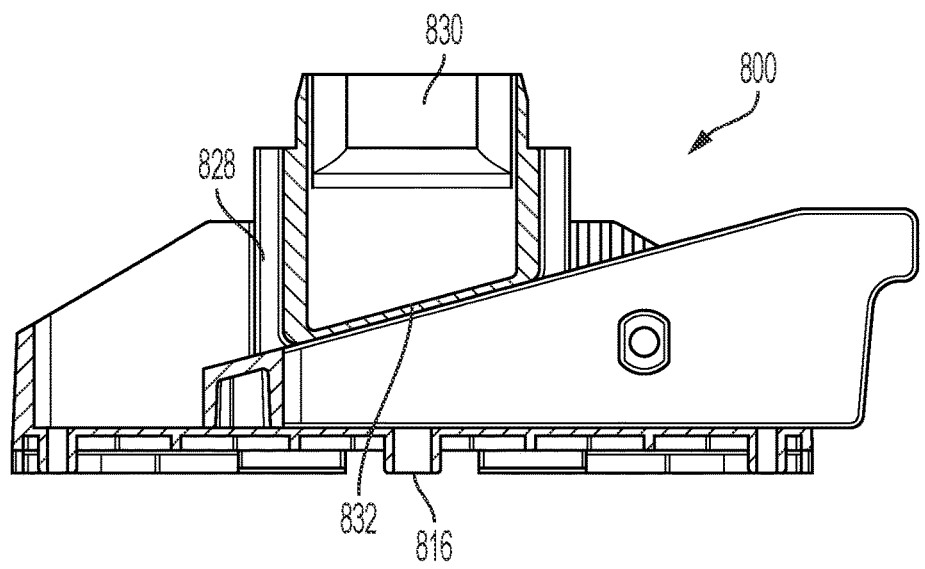
FIG. 19C is a cross-sectional view of the foot of FIG. 19A taken along line C-C.

With further reference to FIGS. 19A-C, foot 800 includes a base 806, a column 808 for receiving vertical member 16', a wedge 810 and a spring 812. Base 806 has a generally rectangular profile defining a recess 822, an underpass 814 for receiving track 802, and a protrusion 816 for securing the base within holes 804 of the track. Recess 822, which may be cross-shaped, is configured to receive column 808. The lateral sidewalls 824 defining the cross-shaped recess 822 of base 806 include teeth 826, or a similar mechanism, for selectively locking wedge 810 as described hereinafter. Each corner 818 of base 806 slopes outwardly and downwardly, away from recess 822, and is designed to center container 310 between four adjacent feet. As a result, after feet 800 have been secured to track 802, the feet act in concert to align and center containers 310 within a respective grid-space as shown in FIG. 6B.

Column 808 is movably disposed within the cross-shaped recess 822 of base 806. Sidewalls 828 of column 808 define a receptacle 830 sized and shaped to receive vertical member 16'. One of more of sidewalls 828 include a tapered lower guide wall 832 arranged to engage wedge 810. When wedge 810 is driven underneath column 808, the wedge engages tapered lower guide wall 832 and forces column 808 to move in the vertical direction away from base 802 which, in turn, lifts vertical member 16' disposed within the receptable 830 of the column. On the other hand, when wedge 810 is moved away from column 808, the wedge slides out from underneath tapered lower guide wall 832 causing the column and vertical member 16' to move downward toward base 806.

Wedge 810 is U-shaped and includes two wings 834. The height of wings 834 increases from a front of wedge 810 toward the rear of the wedge such that the wings have an upper surface that tapers at a corresponding angle to tapered lower guide wall 832, thereby allowing the wedge to be slid further underneath column 808, or out from underneath the column, to adjust the height of the column, which in turn, levels rails 22'. A surface of wings 834 include teeth 836 arranged to engage the teeth 826 of base 806 to selectively lock wedge 810 at a desired location with respect to the base underneath column 808. Wedge 810 is preferably formed from a resilient material such that the wings are compressible toward one another and then expandable away from one another when the force is released. In this manner, a user may compress wings 834 to disengage the teeth 836 of wedge 810 and the teeth 826 of base 806 and allow the wedge to be slide relative to the base. After the height of column 808 has been adjusted as desired, the compressive force may be released causing the teeth 836 of wedge 810 and the teeth 826 of base 806 to engage one another, thereby locking the wedge to the base. In some embodiments, a biasing member such as spring 812 may be disposed between wings 834 to bias the wings apart from one another and assist in locking wedge 810 to base 806. Consequently, frame 14', or the frame of any other storage system, may be leveled by driving wedge 810 further underneath, or out from underneath, column 808.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A robot, comprising:
   a body coupled to a wheel assembly, the wheel assembly including a plurality of wheels arranged to move the body along a first set of rails and a second set of rails extending perpendicular to the first set of rails to define a plurality of grid spaces; and
   a container retrieval device including a grapple having at least three sides, the grapple being extendable and retractable in a vertical direction and arranged to selectively secure an engagement feature positioned between a rim and a bottom surface of a container.

2. The robot of claim 1, wherein the container retrieval device further comprises a pair of support arms having a winding mechanism, the grapple being coupled to the pair of support arms by a cable configured to be wound and unwound about the winding mechanism to extend or retract the grapple in the vertical direction.

3. The robot of claim 2, wherein the grapple comprises two grapple arms and a connecting bar defining a receiving space therebetween.

4. The robot of claim 3, wherein a flap is associated with each of the two grapple arms, each one of the flaps being pivotable between an undeployed condition in which the flap lies substantially flush against an interior surface of a respective grapple arm such that the receiving space is sized to receive a container therein and a deployed condition in which the flap extends away from the respective grapple arm and into the receiving space.

5. The robot of claim 4, wherein each one of the two grapple arms extend along an axis and the flap is pivotable about a pivot axis arranged parallel to the axis.

6. The robot of claim 5, wherein the grapple further comprises an actuator coupled to the flap to pivot the flap about the pivot axis.

7. The robot of claim 6, wherein the grapple further comprises a spring provided between a portion of the grapple arm and the actuator to bias the actuator to a natural position, and wherein when the actuator is in the natural position, the flap is in the undeployed condition.

8. The robot of claim 7, wherein actuation of the actuator compresses the spring and pivots the flap from the undeployed condition to the deployed condition.

9. The robot of claim 2, wherein the container retrieval device is supported by a leg coupled to each one of the support arms, and wherein each one of the legs comprises a spring-loaded bearing or rolling member configured to move along the first and second set of rails.

10. The robot of claim 9, wherein the support arms have a length of approximately one grid-space and each one of the legs is attached to a terminal end of a respective support arm opposite the body.

11. The robot of claim 2, wherein the support arms of the container retrieval device are supported at a first location by the body and at a second location spaced from the body by suspension wires, and wherein the suspension wires are tensioned between a tower extending from the body and an attachment provided at the second location.

12. The robot of claim 1, wherein the wheel assembly further comprises at least one drive mechanism associated with the plurality of wheels, the plurality of wheels being pivotable between a first orientation, in which each one of the plurality of wheels is arranged to move along the first set of rails, and a second orientation, in which each one of the plurality of wheels is arranged to move along the second set of rails.

13. The robot of claim 1, wherein the wheel assembly includes at least one first drive mechanism associated with a first set of wheels oriented and arranged to move along the first set of rails, and at least one second drive mechanism associated with a second set of wheels oriented and arranged to move along the second set of rails.

14. A robot, comprising:
  a body coupled to a wheel assembly, the wheel assembly including a plurality of wheels arranged to move the body along a first set of rails and a second set of rails extending perpendicular to the first set of rails to define a plurality of a grid spaces; and
  a first container retrieval device including a first grapple that is extendable and retractable in a vertical direction, the first grapple comprising two grapple arms and a bar connecting the two grapple arms,
  wherein the first grapple defines a first open lateral side and a first receiving space through lower and upper surfaces such that the first grapple is arranged to selectively secure an engagement feature positioned between a rim and a bottom surface of a container.

15. The robot of claim 14, further comprising a second container retrieval device including a second grapple that is extendable and retractable in the vertical direction, the second grapple having a second open lateral side and defining a second receiving space through lower and upper surfaces.

16. The robot of claim 15, wherein the first container retrieval device is arranged on a first side of the body and the second container retrieval device is arranged on a second side of the body opposite the first side of the body.

17. A system, comprising:
  a frame including vertical members supporting a first set of rails extending in a first direction and a second set of rails extending in a second direction perpendicular to the first direction, the first and second set of rails collectively defining a plurality of grid spaces;
  containers arranged in stacks, each of the stacks being housed within a respective one of the grid spaces such that a gap exists around an entire perimeter of the containers in the stack and between the stack and the vertical members, each container including a bottom and sidewalls collectively defining an interior, the sidewalls having an upper surface forming a rim and an engagement feature positioned between the rim and the bottom; and
  a robot, comprising:
    a body coupled to a wheel assembly, the wheel assembly including a plurality of wheels arranged to move the body along the first set of rails and along the second set of rails; and
    a container retrieval device including a grapple having at least three-sides, the grapple being extendable and retractable in a vertical direction, sized to be lowered into the gap and around the stacks, and arranged to selectively secure the engagement feature and lift the container.

18. The system of claim 17, wherein the bottom of the container includes a nesting feature designed to nest within another container.

19. The system of claim 17, wherein the engagement feature comprises horizontal ribs provided on opposite sidewalls of the container.

20. The system of claim 19, further comprising angled ribs, the angled ribs extending from the horizontal ribs toward the bottom at an oblique angle.

* * * * *